United States Patent
Lam

(10) Patent No.: US 9,634,932 B2
(45) Date of Patent: Apr. 25, 2017

(54) METHOD AND APPARATUS FOR FORWARDING TRAFFIC OF SWITCHING SYSTEM

(71) Applicant: Huawei Technologies Co., Ltd., Shenzhen (CN)

(72) Inventor: Wan Lam, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 144 days.

(21) Appl. No.: 14/795,759

(22) Filed: Jul. 9, 2015

(65) Prior Publication Data

US 2016/0014026 A1    Jan. 14, 2016

(30) Foreign Application Priority Data

Jul. 10, 2014    (CN) .......................... 2014 1 0329324

(51) Int. Cl.
| | |
|---|---|
| *H04L 12/741* | (2013.01) |
| *H04L 12/24* | (2006.01) |
| *H04L 12/703* | (2013.01) |
| *H04L 12/803* | (2013.01) |
| *H04L 12/933* | (2013.01) |

(52) U.S. Cl.
CPC .......... *H04L 45/74* (2013.01); *H04L 41/0668* (2013.01); *H04L 45/28* (2013.01); *H04L 47/122* (2013.01); *H04L 49/15* (2013.01)

(58) Field of Classification Search
None
See application file for complete search history.

(56) References Cited

U.S. PATENT DOCUMENTS

| | | | |
|---|---|---|---|
| 8,687,629 B1 | 4/2014 | Kompella et al. | |
| 8,797,844 B1 * | 8/2014 | Strahle .................... | H04L 45/28 370/219 |
| 8,838,728 B2 * | 9/2014 | Kosonen ............... | H04L 67/306 709/217 |
| 9,344,386 B2 * | 5/2016 | Muthuswamy ......... | H04L 49/45 |

(Continued)

FOREIGN PATENT DOCUMENTS

| | | |
|---|---|---|
| CN | 101098238 A | 1/2008 |
| CN | 101296186 A | 10/2008 |

(Continued)

*Primary Examiner* — Chirag Shah
*Assistant Examiner* — Amar Persaud
(74) *Attorney, Agent, or Firm* — Leydig, Voit & Mayer, Ltd.

(57) ABSTRACT

Embodiments of the present invention provide a method and an apparatus for forwarding traffic of a switching system. The switching system includes a first LCC, at least one second LCC, and at least one third LCC that are interconnected according to a mesh form topology; and the method includes: receiving, by the first LCC, a packet, and parsing the packet to acquire a destination address of the packet; and when the destination address indicates that the packet is to be sent to the third LCC, if a currently preset configuration mode of the switching system is a first configuration mode, bearing, by the first LCC, the packet on a third link, and forwarding the packet to the third LCC, where the first configuration mode indicates that an N-hop mode is currently applied to the switching system, where N is a natural number greater than or equal to 3.

22 Claims, 13 Drawing Sheets

(56) References Cited

U.S. PATENT DOCUMENTS

| | | | |
|---|---|---|---|
| 2003/0200330 A1* | 10/2003 | Oelke | H04L 49/552 |
| | | | 709/238 |
| 2009/0003327 A1* | 1/2009 | Zang | H04L 49/15 |
| | | | 370/359 |
| 2011/0038371 A1* | 2/2011 | Lin | H04L 49/45 |
| | | | 370/389 |
| 2011/0085439 A1* | 4/2011 | Chandrachood | H04L 12/2876 |
| | | | 370/216 |
| 2011/0188387 A1 | 8/2011 | Das et al. | |
| 2012/0033669 A1* | 2/2012 | Mohandas | H04L 45/245 |
| | | | 370/392 |
| 2012/0294314 A1* | 11/2012 | Campbell | H04L 49/356 |
| | | | 370/412 |
| 2014/0119193 A1* | 5/2014 | Anand | H04L 47/125 |
| | | | 370/237 |
| 2014/0369186 A1* | 12/2014 | Ernstrom | H04L 41/0668 |
| | | | 370/228 |
| 2015/0078381 A1* | 3/2015 | Willis | H04L 45/02 |
| | | | 370/392 |
| 2016/0373307 A1* | 12/2016 | Mehra | H04L 45/24 |

FOREIGN PATENT DOCUMENTS

| | | |
|---|---|---|
| CN | 102315892 A | 1/2012 |
| CN | 103269285 A | 8/2013 |
| CN | 103973592 A | 8/2014 |
| EP | 1892905 A1 | 2/2008 |

* cited by examiner

METHOD AND APPARATUS FOR FORWARDING TRAFFIC OF SWITCHING SYSTEM

CROSS-REFERENCE TO RELATED APPLICATION

This application claims priority to Chinese Patent Application No. 201410329324.X, filed on Jul. 10, 2014, which is hereby incorporated by reference in its entirety.

TECHNICAL FIELD

Embodiments of the present invention relate to communications technologies, and in particular, to a method and an apparatus for forwarding traffic of a switching system.

BACKGROUND

In a switching system, a line card chassis (LCC) is generally formed by at least one line card (LC) and at least one switch fabric card (FC). Each LC in an LCC includes at least one fabric interface chip (FIC), and each FC includes at least one switch element (SE). As shown in FIG. 1, in a line card chassis LCC0, there are 16 LCs (LC0 to LC15) and 8 FCs (FC0 to FC7), and there are altogether 32 FICs (FIC0 to FIC31) and 16 SEs (each FC shown in FIG. 1 includes two SEs), where on an FIC side of each SE (that is, a left side of an SE shown in the figure), 64 links (SerDes) are configured to interconnect each SE with all FICs of LCC0, and the other 64 SerDes links (that is, on a right side of an SE shown in FIG. 1) are configured to connect each SE to other LCCs, so that capacity expansion is performed on the switching system.

During capacity expansion, a switching system generally needs to meet a traffic line rate, so that an LCC back-to-back connection or an LCC star connection is generally used during capacity expansion of a switching system in the prior art. The back-to-back connection is shown in FIG. 2, where 64 SerDes links on a right side of an SE of LCC0 are used to connect FCs of LCC0 with FCs of LCC1 in pairs (that is, SEs with a same sequence number on the FCs are also connected in pairs), so that a capacity of a single chassis is doubled; and the star connection may be shown in FIG. 3, where a dedicated fabric card chassis (FFC) is used to connect multiple LCCs together, that is, 4 LCCs in FIG. 3 are connected by using 128 SerDes links provided by FCC0, so as to achieve an objective of capacity expansion.

However, although both the two connection manners in the prior art can meet a traffic line rate of a system, the back-to-back connection manner causes limited capacity expansion, and the star connection manner causes high capacity expansion costs of the system. Therefore, desirable capacity expansion cannot be achieved in both manners.

SUMMARY

Embodiments of the present invention provide a method and an apparatus for forwarding traffic of a switching system, to resolve a technical problem in the prior art that a capacity expansion capability of the switching system is limited and capacity expansion costs are high.

According to a first aspect, an embodiment of the present invention provides a method for forwarding traffic of a switching system, where the switching system includes a first line card chassis LCC, at least one second LCC, and at least one third LCC that are interconnected according to a wireless mesh form topology; and the method includes:

receiving, by the first LCC, a packet, and parsing the packet to acquire a destination address of the packet; and when the destination address indicates that the packet is to be sent to the third LCC, if a currently preset configuration mode of the switching system is a first configuration mode, bearing, by the first LCC, the packet on a third link, and forwarding the packet to the third LCC, where the third link includes: a first link and a second link, or a second link; the first link is a directly connected two-hop link between the first LCC and the third LCC, and a quantity of links included by the first link is at least one; the second link is an n-hop link that passes through the at least one second LCC and that is between the first LCC and the third LCC, and a quantity of links included by the second link is at least one, where n is a natural number, and $3 \leq n \leq N$; and the first configuration mode indicates that an N-hop mode is currently applied to the switching system, where N is a natural number greater than or equal to 3.

With reference to the first aspect, in a first possible implementation manner of the first aspect, the method further includes:

when the destination address indicates that the packet is to be sent to the third LCC, if the currently preset configuration mode of the switching system is a second configuration mode, bearing, by the first LCC, the packet on the first link, and forwarding the packet to the third LCC, where the second configuration mode indicates that a two-hop mode is currently applied to the switching system.

With reference to the first possible implementation manner of the first aspect, in a second possible implementation manner of the first aspect, if the currently preset configuration mode of the switching system is the second configuration mode, the bearing, by the first LCC, the packet on the first link, and forwarding the packet to the third LCC includes:

evenly distributing, by the first LCC, the packet to the at least one link in the first link in a round-robin manner, to perform forwarding.

With reference to the first possible implementation manner of the first aspect, in a third possible implementation manner of the first aspect, if the currently preset configuration mode of the switching system is the second configuration mode, the bearing, by the first LCC, the packet on the first link, and forwarding the packet to the third LCC includes:

acquiring, by the first LCC, status information of the at least one link in the first link; and distributing, by the first LCC according to the status information of the at least one link in the first link, the packet to the at least one link in the first link to perform forwarding.

With reference to the third possible implementation manner of the first aspect, in a fourth possible implementation manner of the first aspect, if the status information indicates congestion degrees of the at least one link in the first link, the distributing, by the first LCC according to the status information, the packet to the at least one link in the first link to perform forwarding includes:

adjusting, by the first LCC according to the congestion degrees of the at least one link in the first link, traffic of the packet distributed to the at least one link in the first link, so that traffic borne on each link in the first link matches a congestion degree of the link.

With reference to the third possible implementation manner of the first aspect, in a fifth possible implementation manner of the first aspect, if the status information indicates abnormality information of the at least one link in the first link, the distributing, by the first LCC according to the status information, the packet to the at least one link in the first link to perform forwarding includes:

determining, by the first LCC, an abnormal link in the first link according to the abnormality information of the at least one link in the first link; and distributing, by the first LCC, the packet to a normal link, other than the abnormal link, in the first link to perform the forwarding.

With reference to the first aspect, in a sixth possible implementation manner of the first aspect, if the currently preset configuration mode of the switching system is the first configuration mode, the bearing, by the first LCC, the packet on a third link, and forwarding the packet to the third LCC includes:

evenly distributing, by the first LCC, the packet to the at least one link in the third link in a round-robin manner, to perform forwarding.

With reference to the first aspect, in a seventh possible implementation manner of the first aspect, when the third link includes the first link and the second link, the bearing, by the first LCC, the packet on a third link, and forwarding the packet to the third LCC includes:

distributing, by the first LCC, the packet to the at least one link in the first link preferentially, and distributing, after the at least one link in the first link reach a saturation state, a remaining packet in the packet to the at least one link in the second link.

With reference to the first aspect, in an eighth possible implementation manner of the first aspect, if the currently preset configuration mode of the switching system is the first configuration mode, the bearing, by the first LCC, the packet on a third link, and forwarding the packet to the third LCC includes:

acquiring, by the first LCC, status information of the at least one link in the third link; and distributing, by the first LCC according to the status information of the at least one link in the third link, the packet to the at least one link in the third link to perform forwarding.

With reference to the eighth possible implementation manner of the first aspect, in a ninth possible implementation manner of the first aspect, if the status information of the at least one link in the third link indicates congestion degrees of the at least one link in the third link, the distributing, by the first LCC according to the status information of the at least one link in the third link, the packet to the at least one link in the third link to perform forwarding includes:

adjusting, by the first LCC according to the congestion degrees of the at least one link in the third link, traffic of the packet distributed to the at least one link in the third link, so that traffic borne on each link in the third link matches a congestion degree of the link.

With reference to the eighth possible implementation manner of the first aspect, in a tenth possible implementation manner of the first aspect, if the status information of the at least one link in the third link indicates abnormality information of the at least one link in the third link, the distributing, by the first LCC according to the status information of the at least one link in the third link, the packet to the at least one link in the third link to perform forwarding includes:

determining, by the first LCC, an abnormal link in the third link according to the abnormality information of the at least one link in the third link; and distributing, by the first LCC, the packet to a normal link, other than the abnormal link, in the third link to perform the forwarding.

With reference to the sixth possible implementation manner of the first aspect or any one of the eighth possible implementation manner to the tenth possible implementation manner of the first aspect, in an eleventh possible implementation manner of the first aspect, the third link includes the first link and the second link, the packet includes a first sub-packet and a second sub-packet, the first sub-packet is a sub-packet to be distributed to the first link, and the second sub-packet is a sub-packet to be distributed to the second link; and the method further includes:

separately adding, by the first LCC, a first original time-scale to the first sub-packet, and adding a second original time-scale to the second sub-packet, where the first original time-scale indicates an initial time at which the first sub-packet arrives at the first LCC, and the second original time-scale indicates an initial time at which the second sub-packet arrives at the first LCC, so that the third LCC separately obtains, according to a first forwarding delay of the first sub-packet and a second forwarding delay of the second sub-packet, a first time-scale by adding a first time-scale compensation to the first original time-scale and a second time-scale by adding a second time-scale compensation to the second original time-scale, so that a time sequence of the first time-scale and the second time-scale is consistent with a time sequence of the first original time-scale and the second original time-scale, where a sum of the first forwarding delay and the first time-scale compensation equals a sum of the second forwarding delay and the second time-scale compensation.

With reference to the seventh possible implementation manner of the first aspect, in a twelfth possible implementation manner of the first aspect, the packet includes a first sub-packet and a second sub-packet, the first sub-packet is a sub-packet to be distributed to the first link, and the second sub-packet is a sub-packet to be distributed to the second link; and the method further includes:

separately adding, by the first LCC, a first original time-scale to the first sub-packet, and adding a second original time-scale to the second sub-packet, where the first original time-scale indicates an initial time at which the first sub-packet arrives at the first LCC, and the second original time-scale indicates an initial time at which the second sub-packet arrives at the first LCC, so that the third LCC separately obtains, according to a first forwarding delay of the first sub-packet and a second forwarding delay of the second sub-packet, a first time-scale by adding a first time-scale compensation to the first original time-scale and a second time-scale by adding a second time-scale compensation to the second original time-scale, so that a time sequence of the first time-scale and the second time-scale is consistent with a time sequence of the first original time-scale and the second original time-scale, where a sum of the first forwarding delay and the first time-scale compensation equals a sum of the second forwarding delay and the second time-scale compensation.

With reference to the first aspect, in a thirteenth possible implementation manner of the first aspect, the first LCC forwards the packet to a destination FIC in the first LCC when the destination address indicates that the packet is to be sent to the first LCC.

According to a second aspect, an embodiment of the present invention provides a first line card chassis LCC in a switching system, where the first LCC is interconnected with at least one second LCC and at least one third LCC according to a wireless mesh form topology; and the first LCC includes at least one switch element SE, where the SE includes:

a first acquiring module, configured to receive a packet, and parse the packet to acquire a destination address of the packet; and a sending module, configured to: when the destination address indicates that the packet is to be sent to the third LCC, if a currently preset configuration mode of the switching system is a first configuration mode, bear the packet on a third link, and forward the packet to the third LCC, where the third link includes: a first link and a second link, or a second link; the first link is a directly connected two-hop link between the first LCC and the third LCC, and a quantity of links included by the first link is at least one; the second link is an n-hop link that passes through the at least one second LCC and that is between the first LCC and the third LCC, and a quantity of links included by the second link is at least one, where n is a natural number, and 3≤n≤N; and the first configuration mode indicates that an N-hop mode is currently applied to the switching system, where N is a natural number greater than or equal to 3.

With reference to the second aspect, in a first possible implementation manner of the second aspect, the sending module is further configured to: when the destination address indicates that the packet is to be sent to the third LCC, if the currently preset configuration mode of the switching system is a second configuration mode, bear the packet on the first link, and forward the packet to the third LCC, where the second configuration mode indicates that a two-hop mode is currently applied to the switching system.

With reference to the first possible implementation manner of the second aspect, in a second possible implementation manner of the second aspect, the sending module is specifically configured to evenly distribute the packet to the at least one link in the first link in a round-robin manner, to perform forwarding.

With reference to the first possible implementation manner of the second aspect, in a third possible implementation manner of the second aspect, the SE further includes: a second acquiring module, where the second acquiring module is configured to acquire status information of the at least one link in the first link; and the sending module is configured to distribute, according to the status information, acquired by the second acquiring module, of the at least one link in the first link, the packet to the at least one link in the first link to perform forwarding.

With reference to the third possible implementation manner of the second aspect, in a fourth possible implementation manner of the second aspect, if the status information acquired by the second acquiring module indicates congestion degrees of the at least one link in the first link, the sending module is specifically configured to adjust, according to the congestion degrees of the at least one link in the first link, traffic of the packet distributed to the at least one link in the first link, so that traffic borne on each link in the first link matches a congestion degree of the link.

With reference to the third possible implementation manner of the second aspect, in a fifth possible implementation manner of the second aspect, if the status information acquired by the second acquiring module indicates abnormality information of the at least one link in the first link, the SE further includes: a first determining module, where the first determining module is configured to determine an abnormal link in the first link according to the abnormality information of the at least one link in the first link; and the sending module is configured to distribute the packet to a normal link, other than the abnormal link, in the first link to perform the forwarding.

With reference to the second aspect, in a sixth possible implementation manner of the second aspect, the sending module is specifically configured to evenly distribute the packet to the at least one link in the third link in a round-robin manner, to perform forwarding.

With reference to the second aspect, in a seventh possible implementation manner of the second aspect, when the third link includes the first link and the second link, the sending module is specifically configured to distribute the packet to the at least one link in the first link preferentially, and distribute, after the at least one link in the first link reach a saturation state, a remaining packet in the packet to the at least one link in the second link.

With reference to the second aspect, in an eighth possible implementation manner of the second aspect, the SE further includes: a third acquiring module, where the third acquiring module is configured to acquire status information of the at least one link in the third link; and the sending module is configured to distribute, according to the status information, acquired by the third acquiring module, of the at least one link in the third link, the packet to the at least one link in the third link to perform forwarding.

With reference to the eighth possible implementation manner of the second aspect, in a ninth possible implementation manner of the second aspect, if the status information acquired by the third acquiring module indicates congestion degrees of the at least one link in the third link, the sending module is specifically configured to adjust, according to the congestion degrees of the at least one link in the third link, traffic of the packet distributed to the at least one link in the third link, so that traffic borne on each link in the third link matches a congestion degree of the link.

With reference to the eighth possible implementation manner of the second aspect, in a tenth possible implementation manner of the second aspect, if the status information acquired by the third acquiring module indicates abnormality information of the at least one link in the third link, the SE further includes: a second determining module, where the second determining module is configured to determine an abnormal link in the third link according to the abnormality information of the at least one link in the third link; and the sending module is configured to distribute the packet to a normal link, other than the abnormal link, in the third link to perform the forwarding.

With reference to the sixth possible implementation manner of the second aspect or any one of the eighth possible implementation manner to the tenth possible implementation manner of the second aspect, in an eleventh possible implementation manner of the second aspect, the third link includes the first link and the second link, the packet includes a first sub-packet and a second sub-packet, the first sub-packet is a sub-packet to be distributed to the first link, and the second sub-packet is a sub-packet to be distributed to the second link; and the SE further includes:

a first time-scale adding module, configured to separately add a first original time-scale to the first sub-packet and add a second original time-scale to the second sub-packet, where the first original time-scale indicates an initial time at which the first sub-packet arrives at the first LCC, and the second original time-scale indicates an initial time at which the second sub-packet arrives at the first LCC, so that the third LCC separately obtains, according to a first forwarding delay of the first sub-packet and a second forwarding delay of the second sub-packet, a first time-scale by adding a first time-scale compensation to the first original time-scale and a second time-scale by adding a second time-scale compensation to the second original time-scale, so that a time sequence of the first time-scale and the second time-scale is consistent with a time sequence of the first original time-scale and the second original time-scale, where a sum of the first forwarding delay and the first time-scale compensation equals a sum of the second forwarding delay and the second time-scale compensation.

With reference to the seventh possible implementation manner of the second aspect, in a twelfth possible implementation manner of the second aspect, the packet includes a first sub-packet and a second sub-packet, the first sub-packet is a sub-packet to be distributed to the first link, and the second sub-packet is a sub-packet to be distributed to the second link; and the SE further includes:

a second time-scale adding module, configured to separately add a first original time-scale to the first sub-packet and add a second original time-scale to the second sub-packet, where the first original time-scale indicates an initial time at which the first sub-packet arrives at the first LCC, and the second original time-scale indicates an initial time at which the second sub-packet arrives at the first LCC, so that the third LCC separately obtains, according to a first forwarding delay of the first sub-packet and a second forwarding delay of the second sub-packet, a first time-scale by adding a first time-scale compensation to the first original time-scale and a second time-scale by adding a second time-scale compensation to the second original time-scale, so that a time sequence of the first time-scale and the second time-scale is consistent with a time sequence of the first original time-scale and the second original time-scale, where a sum of the first forwarding delay and the first time-scale compensation equals a sum of the second forwarding delay and the second time-scale compensation.

With reference to the second aspect, in a thirteenth possible implementation manner of the second aspect, the first LCC further includes: a fabric interface chip FIC; and the sending module is further configured to forward the packet to the FIC when the destination address indicates that the packet is to be sent to the FIC.

In the method for forwarding traffic of a switching system according to embodiments of the present invention, according to a first configuration mode configured for the switching system, a first LCC bears a received packet on a third link that is between the first LCC and a third LCC, and forwards the received packet to the third LCC. Therefore, not only line rate forwarding of a packet in the switching system is implemented between any two nodes, but also a capacity expansion capability of the switching system is improved and capacity expansion costs of the switching system are reduced.

BRIEF DESCRIPTION OF DRAWINGS

To describe the technical solutions in the embodiments of the present invention or in the prior art more clearly, the following briefly introduces the accompanying drawings required for describing the embodiments of the present invention or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 4:
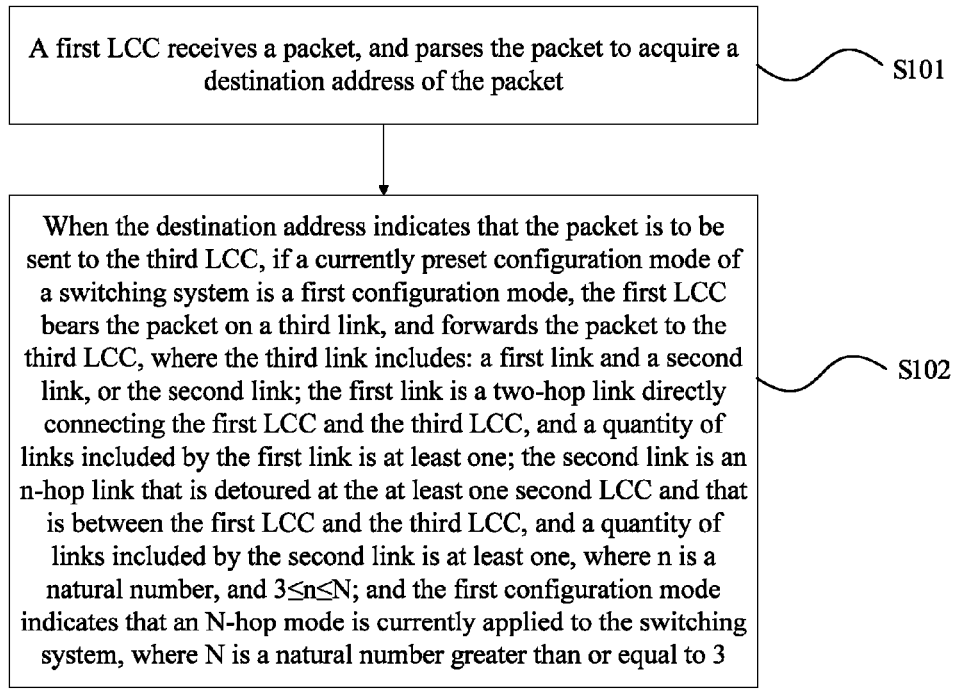
FIG. 4 is a schematic flowchart of a method for forwarding traffic of a switching system according to Embodiment 1 of the present invention.

FIG. 4 is a schematic flowchart of a method for forwarding traffic of a switching system according to Embodiment 1 of the present invention. The method is applied to a switching system, where the switching system includes a first LCC, at least one second LCC, and at least one third LCC that are interconnected according to a wireless mesh form topology. Each of the first LCC, the second LCC, and the third LCC herein includes at least one SE. At least one SE in the first LCC is separately connected to at least one SE in the second LCC and at least one SE in the third LCC, and at least one SE in the second LCC is connected to the at least one SE in the third LCC. Persons skilled in the art should know that, each SE serves as an execution body used when an LCC corresponding to each SE receives or sends a packet, which is not described subsequently for convenience of description.

As shown in FIG. 4, the method includes:

S101: A first LCC receives a packet, and parses the packet to acquire a destination address of the packet.

Specifically, the first LCC receives, by using an SE in the first LCC, a packet sent by a network side device, where the packet may include multiple sub-packets, and these sub-packets are sent to the first LCC in a form of data stream, that is, the network side device continually sends sub-packets to the first LCC. After receiving the sub-packets, the SE in the first LCC parses these sub-packets to obtain destination addresses of these sub-packets.

S102: When the destination address indicates that the packet is to be sent to the third LCC, if a currently preset configuration mode of the switching system is a first configuration mode, the first LCC bears the packet on a third link, and forwards the packet to the third LCC, where the third link includes: a first link and a second link, or a second link; the first link is a directly connected two-hop link between the first LCC and the third LCC, and a quantity of links included by the first link is at least one; the second link is an n-hop link that passes through the at least one second LCC and that is between the first LCC and the third LCC, and a quantity of links included by the second link is at least one, where n is a natural number, and $3 \leq n \leq N$; and the first configuration mode indicates that an N-hop mode is currently applied to the switching system, where N is a natural number greater than or equal to 3.

Specifically, when the first LCC determines that the destination addresses of the sub-packets in the packet are the third LCC, and the first LCC determines that the currently preset configuration mode of the switching system is the first configuration mode (the first configuration mode indicates that an N-hop mode is currently applied to the switching system), these sub-packets are borne on the third link that is between the first LCC and the third LCC, and are forwarded to the third LCC. The third link may include the second link, or may include the first link and the second link. The first link is a directly connected two-hop link between the first LCC and the third LCC, and a quantity of links included by the first link is at least one; and the second link is an n-hop link that passes through the at least one second LCC and that is between the first LCC and the third LCC, and a quantity of links included by the second link is at least one. It should be noted that, two hops or N hops herein refers to that a packet is relayed by SEs in 2 or N LCCs in a forwarding process, that is, two hops refers to that a packet is forwarded from an SE to another SE, three hops refers to that a packet is forwarded from an SE, and arrives at a third SE after being relayed by another SE, and the N-hop mode herein is downward compatible, for example, in a three-hop mode, data may be forwarded by using a two-hop link and a three-hop link, or data may be forwarded by using only a three-hop link. That is, when the first LCC determines that the N-hop mode is currently applied to the switching system, the first LCC may directly forward some sub-packets in the packet to the third LCC by using the first link, and forward remaining sub-packets in the packet to the third LCC by using the at least one second LCC (that is, the remaining sub-packets are forwarded to the third LCC by using the second link); or the sub-packets may be forwarded to the third LCC by using only the second link, so that the first LCC forwards the entire received packet to the third LCC, thereby achieving a traffic line rate between the first LCC and the third LCC.

In the prior art, in a switching system in a back-to-back form, a packet is directly forwarded from a source LCC to a destination LCC, by which a traffic line rate can be achieved, but only in a case in which traffic of the packet is relatively small, and in addition, a capacity expansion capability of the switching system is limited (because there are only two LCCs); and in a switching system in a star connection, although a line rate can also be achieved by forwarding a packet by using an FCC, only by deploying an FCC in the switching system, the traffic line rate can be achieved and a capacity expansion objective can be achieved, and the introduction of the FCC increases costs of the switching system during traffic forwarding and capacity expansion. However, in an embodiment of the present invention, line rate forwarding of a packet can be achieved by using only at least three LCCs, a capacity expansion capability of a switching system is improved because a quantity of second LCCs is not limited and neither an FCC needs to be deployed in the switching system, thereby reducing corresponding costs.

In the method for forwarding traffic of a switching system according to embodiments of the present invention, according to a first configuration mode configured for the switching system, a first LCC bears a received packet on a third link that is between the first LCC and a third LCC, and forwards the received packet to the third LCC. Therefore, not only line rate forwarding of a packet in the switching system is implemented between any two nodes, but also a capacity expansion capability of the switching system is improved and capacity expansion costs of the switching system are reduced.

As an optional implementation manner of Embodiment 1 shown in the foregoing FIG. 4, the method in the foregoing FIG. 4 may further include:

S103: The first LCC directly sends the packet to a destination FIC in the first LCC when the destination address indicates that the packet is to be sent to the destination FIC in the first LCC.

Based on the foregoing embodiment shown in FIG. 4, as a possible implementation manner of Embodiment 1 of the present invention, this embodiment relates to a specific process: the first LCC forwards the packet to the third LCC when the first LCC determines that the currently preset configuration mode of the switching system is a second configuration mode. Specifically, the foregoing S102 specifically includes that: when the destination address indicates that the packet is to be sent to the third LCC, if the currently preset configuration mode of the switching system is the second configuration mode, the first LCC bears the packet on a first link, and forwards the packet to the third LCC, where the second configuration mode indicates that a two-hop mode is currently applied to the switching system.

When the currently preset configuration mode of the switching system is the second configuration mode, that is, when the two-hop mode is currently applied to the switching system, the first LCC may directly bear the packet on the first link, and forward the packet to the third LCC, and this situation generally occurs in a case in which there are less packets sent by a network side to the first LCC, that is, in a case in which traffic of the packet is relatively small.

To better describe a two-hop implementation manner of this embodiment, a specific switching system is used as an example for description herein. Referring to a switching system shown in FIG. 5, the switching system includes 1 first LCC (LCC0), 2 second LCCs (LCC1 and LCC2), and 1 third LCC (LCC3), and each LCC includes 1 SE0. SE0 in LCC0 is separately connected to SE0s in LCC1, in LCC2, and in LCC3; and SE0 in LCC1 is separately connected to SE0s in LCC2 and in LCC3; and SE0 in LCC2 is connected to SE0 in LCC3.

Certainly, each LCC may include multiple SEs, and operations executed by the SEs to forward a packet are the same. That is, when an FIC (for example, FIC0) in an LCC (for example, LCC0) receives a packet (the packet actually includes multiple sub-packets), because FIC0 may be connected to multiple SEs that are in LCC0, FIC0 may send the multiple sub-packets in the packet by using one SE or by using multiple SEs, as long as the packet can be sent from an LCC to another LCC. For convenience of description of technical solutions of the embodiments of the present invention, in an example in FIG. 5, that one LCC includes one SE0 is used as an example for description:

When the configuration mode of the switching system indicates the two-hop mode, when receiving a packet (the packet actually includes multiple sub-packets) sent by a network side, SE0 in LCC0 forwards the packet to LCC3 by using SE0. Optionally, if both SE0 and an SE1 in LCC0 provide at least one link, it should be noted that, in the switching system of the present invention, each link may specifically be implemented by a serializer/deserializer (Serdes), and the Serdes is used as an example in the following, where all these Serdeses may be called a first link and these Serdeses are two-hop links (that is, a packet passes through two SEs during forwarding) in direct connections. Therefore, SE0 and/or SE1 in LCC0 can distribute, according to a preset rule, the multiple received sub-packets to multiple SerDes links between LCC0 and LCC3. Specifically, there may be two implementation manners.

A first manner: The first LCC evenly distributes the packet to the at least one link in the first link in a round-robin manner, to perform forwarding.

Figure 5:
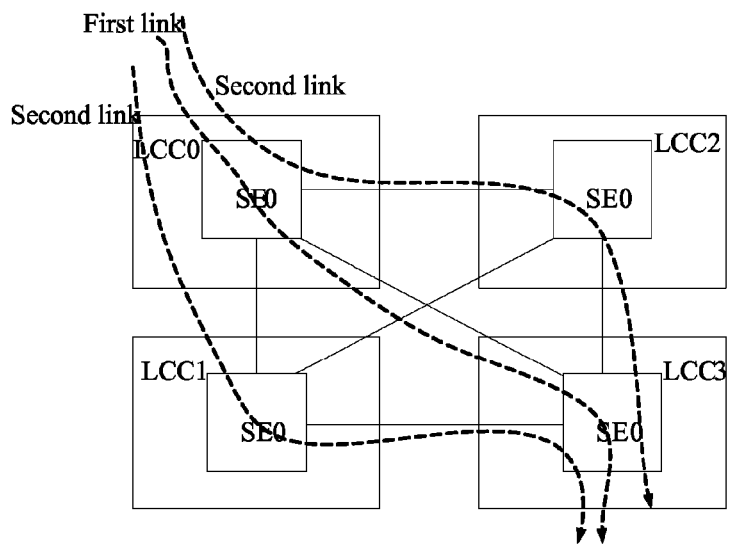
FIG. 5 is topology diagram 1 of a switching system according to an embodiment of the present invention.

Specifically, still referring to the switching system shown in FIG. 5, after receiving the packet sent by the network side, that is, after receiving the multiple sub-packets sent by the network side, LCC0 evenly distributes these sub-packets to the first link in the round-robin manner, that is, evenly distributes the sub-packets to all SerDeses directly connecting LCC0 and LCC3, and it should be known that "evenly distribute" herein refers to that traffic of the sub-packets distributed to all SerDeses is even. For example, assuming that: SE0 of LCC0 provides 4 SerDes links, that is, the first link includes 4 SerDes links, which are 0# to 3# respectively, that is, LCC0 is directly connected to LCC3 by using the 4 SerDes links of SE0; SE0 of LCC0 receives 9 sub-packets, which are 0# to 8# respectively, and then, LCC0 distributes sub-packet 0# to SerDes 0#, distributes sub-packet 1# to SerDes 1#, distributes sub-packet 2# to SerDes 2#, distributes sub-packet 3# to SerDes 3#, distributes sub-packet 4# to SerDes 0#, distributes sub-packet 5# to SerDes 1#, and so on, until sub-packet 8# is distributed to SerDes 0#.

A second manner: The first LCC acquires status information of the at least one link in the first link; and distributes, according to the status information of the at least one link in the first link, the packet to the at least one link in the first link to perform forwarding.

Specifically, during specific implementation, that the first LCC acquires status information of the at least one link in the first link may be that the first LCC monitors the at least one link in the first link to acquire the status information, or may be that the third LCC feeds back the status information of the at least one link in the first link to the first LCC.

When the status information indicates congestion degrees of the at least one link in the first link, the first LCC adjusts, according to the congestion degrees of the at least one link in the first link, traffic of the packet distributed to the at least one link in the first link, so that traffic borne on each link in the first link matches a congestion degree of the link. For example, FIG. 5 is still used as an example, where SE0 of LCC0 provides 4 SerDes links, which are 0# to 3# respectively, that is, LCC0 is directly connected to LCC3 by using the 4 SerDes links of SE0; and SE0 of LCC0 receives 9 sub-packets, which are 0# to 8# respectively. If LCC0 learns that SerDes 0# and SerDes 1# are relatively congested, when distributing sub-packets 0# to 8#, LCC0 may choose to skip distributing a sub-packet or distribute less sub-packets to SerDes 0# and SerDes 1#, and to distribute more sub-packets to SerDes 2# and SerDes 3# that are not congested, so that traffic of the packet borne on each SerDes link matches a congestion degree of each link.

When the status information indicates abnormality information of the at least one link in the first link, the first LCC determines, an abnormal link in the first link according to the abnormality information of the at least one link in the first link; and distributes the packet to a normal link, other than the abnormal link, in the first link. For example, FIG. 5 is still used as an example. SE0 of LCC0 provides 4 SerDes links, which are 0# to 3# respectively, that is, LCC0 is directly connected to LCC3 by using the 4 SerDes links of SE0; and SE0 of LCC0 receives 9 sub-packets, which are 0# to 8# respectively. If LCC0 learns, according to the abnormality information of the first link, that SerDes 0# is abnormal, when distributing sub-packets 0# to 8#, LCC0 may evenly or unevenly distribute the 9 sub-packets to SerDes 1# to SerDes 3#.

In the method for forwarding traffic of a switching system according to the present invention, according to a second configuration mode configured for the switching system, a first LCC bears a received packet on a first link that is between the first LCC and a third LCC, and forwards the received packet to the third LCC. Therefore, not only line rate forwarding of a packet in the switching system is implemented between any two nodes, but also a capacity expansion capability of the switching system is improved and capacity expansion costs of the switching system are reduced.

Based on the foregoing embodiment shown in FIG. 4, as another possible implementation manner of Embodiment 1 of the present invention, this embodiment relates to a specific process: when the first LCC determines that the currently preset configuration mode of the switching system is the first configuration mode, that is, the N-hop (N is a natural number greater than or equal to 3) mode is currently applied to the switching system, the first LCC bears the packet on the third link, and forwards the packet to the third LCC.

To better describe an N-hop implementation manner of this embodiment, a specific switching system is used as an example for description herein. Referring to a switching system shown in FIG. 6, the switching system includes 1 first LCC (LCC0), 3 second LCCs (LCC1, LCC2, and LCC3), and 1 third LCC (LCC4), and each LCC includes 1 SE0. SE0 in LCC0 is separately connected to SE0s in LCC1, in LCC2, in LCC3, and in LCC4; SE0 in LCC1 is separately connected to SE0s in LCC2, in LCC3, and in LCC4; SE0 in LCC2 is separately connected to SE0s in LCC1, in LCC3, and in LCC4; and SE0 in LCC3 is connected to SE0s in LCC1, in LCC2, and in LCC4.

When a configuration mode of the switching system indicates an N-hop mode, when receiving a packet (the packet actually includes multiple sub-packets) sent by a network side, LCC0 forwards the packet to SE0 in a second LCC (the second LCC herein may be any LCC or multiple LCCs of LCC1, LCC2, and LCC3) by using SE0 in LCC0, and the packet is forwarded to SE0 in LCC 4 by using SE0 in the second LCC (the second LCC herein may be any LCC or multiple LCCs of LCC1, LCC2, and LCC3). Optionally, if SE0 of each of the LCCs provides at least one SerDes link, a SerDes link that enables a packet to arrive at LCC4 directly from LCC0 is called a first link (that is, a two-hop link), a SerDes link that enables a packet to arrive at LCC4 from LCC0 by passing through one or more LCCs of LCC1, LCC2, and LCC3 is called a second link (an n-hop link). SE0 in LCC0 may distribute, according to a preset rule, the multiple received sub-packets to a third link that is between LCC0 and LCC3, where the third link includes: the second link, or the first link and the second link. Specifically, there may be three implementation manners:

A first manner: The first LCC evenly distributes the packet to the at least one link in the third link in a round-robin manner, to perform forwarding.

Optionally, after receiving the multiple sub-packets sent by the network side, the first LCC may evenly distribute these sub-packets to the at least one link in the third link in the "round-robin" manner, to perform the forwarding. Optionally, all these sub-packets may be distributed to the at least one link in the second link, to be forwarded to the third LCC, or some sub-packets of these sub-packets may be evenly distributed to the at least one link in the first link, to be forwarded to the third LCC, and remaining sub-packets are evenly distributed to the at least one link in the second link, to be forwarded to the third LCC.

Figure 6:
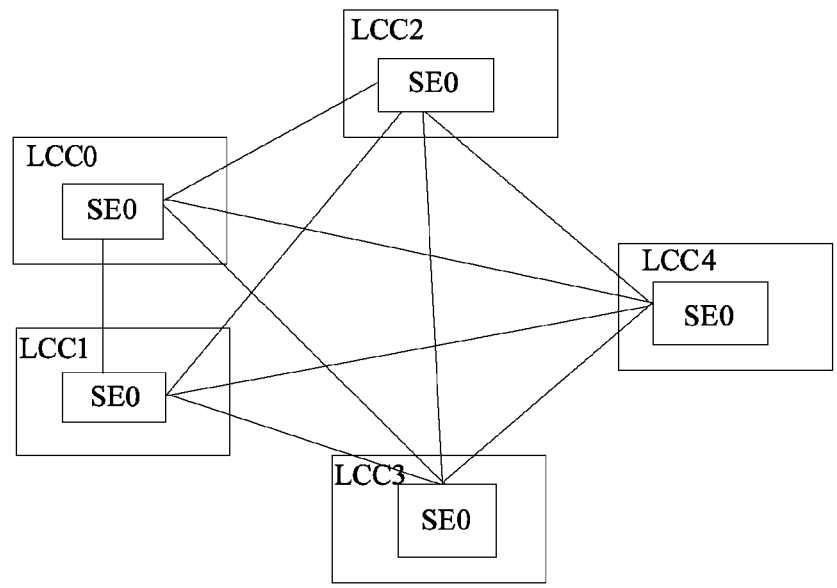
FIG. 6 is topology diagram 2 of a switching system according to an embodiment of the present invention.

Specifically, still referring to the switching system shown in FIG. 6, after receiving the packet sent by the network side, that is, after receiving the multiple sub-packets sent by the network-side, LCC0 evenly distributes these sub-packets to the at least one link in the third link in the "round-robin" manner, that is, evenly distributes these sub-packets to the at least one SerDes link. For example, assuming that: the third link includes the first link and the second link, and a sum of quantities of first links and second links is 4, SerDes 0# and SerDes 1# are the first links, SerDes 2# and SerDes 3# are the second links, and SE0 of LCC0 receives 9 sub-packets, which are 0# to 8# respectively, and then, LCC0 distributes sub-packet 0# to SerDes 0#, distributes sub-packet 1# to SerDes 1#, distributes sub-packet 2# to SerDes 2#, distributes sub-packet 3# to SerDes 3#, distributes sub-packet 4# to SerDes 0#, distributes sub-packet 5# to SerDes 1#, and so on, until sub-packet 8# is distributed to SerDes 0#.

A second manner: The first LCC distributes the packet to the at least one link in the first link preferentially, and distributes, after the at least one link in the first link reach a saturation state, a remaining packet in the packet to the at least one link in the second link.

Specifically, in the implementation manner, the third link includes only the first link and the second link. The switching system shown in FIG. 6 is still used as an example. A quantity of third links equals a sum of the quantities of the first links and the second links, that is, the quantity of the third links is 4, SerDes 0# and SerDes 1# are the first links, SerDes 2# and SerDes 3# are the second links, and SE0 of LCC0 receives 9 sub-packets, which are 0# to 8# respectively, and then, LCC0 distributes some sub-packets in the received packet to SerDes 0# and SerDes 1# preferentially. Assuming that after LCC0 evenly or unevenly distributes sub-packets 0# to 4# to SerDes 0# and SerDes 1#, SerDes 0# and SerDes 1# have reached a saturation state, LCC0 evenly or unevenly distributes remaining sub-packets 5# to 8# in the received packet to SerDes 2# and SerDes 3#.

A third manner: The first LCC acquires status information of the at least one link in the third link; and distributes, according to the status information of the at least one link in the third link, the packet to the at least one link in the third link to perform forwarding.

Specifically, the first LCC may actively acquire the status information of the at least one link in the third link, that is, the first LCC may monitor the at least one link in the third link to acquire the status information of the at least one link in the third link, or the second LCC and/or the third LCC may feed back the status information of the at least one link in the third link to the first LCC.

If the status information indicates congestion degrees of the at least one link in the third link, the first LCC adjusts, according to a congestion degree of the at least one link in the third link, traffic of the packet distributed to the at least one link in the third link, so that traffic borne on each link in the third link matches a congestion degree of the link. For example, FIG. 6 is still used as an example. Assuming that the third link includes the first link and the second link, a sum of quantities of first links and second links is 4, SerDes 0# and SerDes 1# are the first links, SerDes 2# and SerDes 3# are the second links, and SE0 of LCC0 receives 9 sub-packets, which are 0# to 8# respectively. If LCC0 learns that SerDes 0# and SerDes 1# are relatively congested, when distributing sub-packets 0# to 8#, LCC0 may choose to skip distributing or distribute less packets to SerDes 0# and SerDes 1#, and to distribute more sub-packets to the remaining SerDes 2# and SerDes 3# that are not congested, so that traffic of the packet borne on each SerDes link of the 4 SerDes links matches a congestion degree of each link.

If the status information indicates abnormality information of the at least one link in the third link, the first LCC determines an abnormal link in the third link according to the abnormality information of the at least one link in the third link; and distributes the packet to a normal link, other than the abnormal link, in the third link. For example, FIG. 6 is still used as an example. Assuming that the third link includes the first link and the second link, a sum of quantities of first links and second links is 4, SerDes 0# and SerDes 1# are the first links, SerDes 2# and SerDes 3# are the second links, and SE0 of LCC0 receives 9 sub-packets, which are 0# to 8# respectively. If LCC0 learns, according to abnormality information of the first link and the second link, that SerDes 0# is abnormal, when distributing sub-packets 0# to 8#, LCC0 may evenly or unevenly distribute the 9 sub-packets to SerDes 1# to SerDes 3#.

In the method for forwarding traffic of a switching system according to embodiments of the present invention, according to a first configuration mode configured for the switching system, a first LCC bears a received packet on a third link that is between the first LCC and a third LCC, and forwards the received packet to the third LCC. Therefore, not only line rate forwarding of a packet in the switching system is implemented between any two nodes, but also a capacity expansion capability of the switching system is improved and capacity expansion costs of the switching system are reduced.

Based on the foregoing embodiment, as a third possible implementation manner of Embodiment 1 of the present invention, this embodiment relates to a specific process: the first LCC marks time-scales on the multiple received sub-packets, and the third LCC adds, in a process in which the multiple sub-packets are forwarded to the third LCC, time-scale compensations to the sub-packets, so that the sub-packets carry time-scales obtained by compensation, so that the third LCC sequences all the sub-packets according to the time-scales that are obtained by compensation and that are carried by the sub-packets. The third link in this embodiment includes only the first link and the second link.

Specifically, the packet received by the first LCC may include a first sub-packet and a second sub-packet, where the first sub-packet is a sub-packet to be distributed to the first link, and the second sub-packet is a sub-packet to be distributed to the second link. When the first sub-packet arrives at an entrance of the first LCC, the first LCC marks a time-scale, that is, a first original time-scale, on the first sub-packet according to a time at which the first sub-packet arrives at the first LCC; and when the second sub-packet arrives at the entrance of the first LCC, the first LCC also marks a time-scale, that is, a second original time-scale, on the second sub-packet according to a time at which the second sub-packet arrives at the first LCC. That is, the first original time-scale indicates an initial time at which the first sub-packet arrives at the first LCC, and the second original time-scale indicates an initial time at which the second sub-packet arrives at the first LCC.

Then, the first LCC distributes the first sub-packet and the second sub-packet to the first link and the second link that are between the first LCC and the third LCC, to perform forwarding. However, because there is a difference between delays of the first link and the second link, the first sub-packet and the second sub-packet arrive at the third LCC in different sequences because of forwarding delays, that is, the first sub-packet arrives at the third LCC after a first forwarding delay, while the second sub-packet can arrive at the third LCC only after a second forwarding delay because of participation of a second LCC, and in addition, the second forwarding delay is a sum of a delay 1 for which the second sub-packet is forwarded from the first LCC to the second LCC and a delay 2 for which the second LCC forwards the second sub-packet to the third LCC, where the delay 2 herein may be a delay for which the second LCC directly forwards the second sub-packet to the third LCC, or may be a delay for which the second LCC forwards, after passing through another one or more second LCCs, the second sub-packet to the third LCC. It should be noted that, a forwarding delay of each link may include an optical fiber transmission delay, an SE processing delay, and the like. When receiving the first sub-packet, the third LCC adds the first forwarding delay to the time-scale of the first sub-packet, that is, a time-scale carried by the first sub-packet when the first sub-packet is at an entrance of the third LCC is a sum of the first original time-scale and the first forwarding delay; and when receiving the second sub-packet, the second LCC adds the delay 1 to the time-scale of the second sub-packet, and when the second sub-packet arrives at the entrance of the third LCC from the second LCC, the third LCC adds the delay 2 to the time-scale of the second sub-packet, that is, a time scale carried by the second sub-packet when the second sub-packet is at the entrance of the third LCC is a sum of the second original time-scale, the delay 1, and the delay 2, that is, a sum of the second original time-scale and the second forwarding delay. Therefore, in order to sequence the first sub-packet and the second sub-packet to restore an original sequence of the packet, the third LCC needs to separately obtain, according to the first forwarding delay of the first sub-packet and the second forwarding delay of the second sub-packet, a first time-scale by adding a first time-scale compensation to the first original time-scale and a second time-scale by adding a second time-scale compensation to the second original time-scale, so that a time sequence of the first time-scale and the second time-scale is consistent with a time sequence of the first original time-scale and the second original time-scale. Actually, the first time-scale equals a sum of the first original time-scale, the first forwarding delay, and the first time-scale compensation, and the second time-scale equals a sum of the second original time-scale, the second forwarding delay, and the second time-scale compensation. A sum of the first forwarding delay and the first time-scale compensation equals a sum of the second forwarding delay and the second time-scale compensation. The third LCC sequences the first sub-packet and the second sub-packet according to the first time-scale and the second time-scale, to restore the initial sequence of the packet.

To better describe that the first LCC adds time-scale compensations to the first sub-packet and the second sub-packet, so that the third LCC restores the original sequence of the packet according to the time-scales obtained after compensation, the switching system shown in FIG. 5 is used as an example herein to describe in detail a process of adding the time-scale compensations. The process is specifically as follows:

A traffic forwarding mode configured for the switching system shown in FIG. 5 is a 3-hop Mesh mode. Assuming that the packet received by LCC0 includes an initial packet, a middle packet, and a tail packet, where the initial packet is the first sub-packet, and the middle packet and the tail packet are the second sub-packet. When LCC0 receives the initial packet, the middle packet, and the tail packet, LCC0 may mark, in a sequence, a time-scale 1 (assuming that the initial packet arrives at LCC0 at 1 o'clock, the time-scale 1 is the second original time-scale, and the initial packet is forwarded on the second link between LCC0 and LCC3) on the initial packet, mark a time-scale 2 (assuming that the middle packet arrives at LCC0 at 2 o'clock, the time-scale 2 is the second original time-scale, and the middle packet is forwarded on the second link between LCC0 and LCC3) on the middle packet, and mark a time-scale 3 (assuming that the tail packet arrives at LCC0 at 3 o'clock, the time-scale 3 is the first original time-scale, and the tail packet is forwarded on the first link between LCC0 and LCC3) on the tail packet. Then, LCC0 may send the 3 packets in a time sequence. That is, SE0 in LCC0 sends the initial packet to SE0 in LCC1, sends the middle packet to SE0 in LCC2, and sends the tail packet to SE0 in LCC3. Therefore, the tail packet may arrive at LCC3 before the initial packet and the middle packet arrive at LCC3.

Assuming that the initial packet arrives at an entrance of SE0 in LCC1 (the initial packet has not entered SE0 in LCC1 in this case) after a delay 1 (for example, 1 hour), SE0 in LCC1 may add a 1-hour delay to the initial packet at the entrance, and adds an identifier indicating that the initial packet has passed through 2 hops (that is, the initial packet has passed through SE0 of LCC0 and SE0 of LCC1 in this case, which is so called 2-hop) to the initial packet when the initial packet arrives at an exit of SE0 of LCC1, and then, the initial packet arrives at an entrance of LCC3 after a delay 2 (for example, 1 hour). Therefore, a time-scale marked when the initial packet arrives at an entrance of SE0 of the third LCC is 1+1+1=3 o'clock (that is, the second forwarding delay is 2 hours).

Assuming that when the tail packet arrives at an entrance of SE0 of LCC3 (that is, because the tail packet has not entered SE0 of LCC3 in this case, the tail packet has passed through only 1 hop in this case) after the first forwarding delay (for example, 0.5 hours), SE0 in LCC3 adds a 0.5-hour delay to the tail packet, and then, a time-scale marked when the tail packet arrives at the entrance of SE0 of LCC3 is half past three.

Assuming that when the middle packet arrives at an entrance of SE0 in LCC2 (the middle packet has not entered SE0 in LCC2 in this case) after a delay 1 (for example, 1 hour), SE0 in LCC2 adds a 1-hour delay to the middle packet, and SE0 of LCC2 adds, at an exit of SE0 of LCC2, an identifier indicating that the middle packet has passed through 2 hops (that is, the middle packet has passed through SE0 of LCC0 and SE0 of LCC2, which is so called 2-hop) to the middle packet, and then, the middle packet arrives at an entrance of LCC3 after a delay 2 (for example, 1 hour). Therefore, a time-scale marked when the middle packet arrives at the entrance of SE0 of LCC3 is 2+1+1=4 o'clock (that is, the second forwarding delay is 2 hours).

Then, the third LCC adds the first time-scale compensation to the tail packet according to the first forwarding delay, adds second time-scale compensations to the initial packet and the middle packet, and ensures that the sum of the first forwarding delay and the first time-scale compensation equals the sum of the second forwarding delay and the second time-scale compensation. That is, the first time-scale compensation added to the tail packet by the third LCC may be 2.5 hours, the second time-scale compensation added to the initial packet and the middle packet by the third LCC may be 1 hour, and in this way, the first time-scale marked when the tail packet arrives at the SE0 of the third LCC is 6 o'clock, a second time-scale marked when the middle packet arrives at SE0 of the third LCC is 5'clock, and a second time-scale marked when the initial packet arrives at SE0 of the third LCC is 4 o'clock. That is, different time-scale compensations are added to the initial packet, middle packet, and tail packet, but the three packets are still in the sequence in which the tail packet arrives at SE0 of LCC3 first (because a link for forwarding the tail packet is a direct link), and the initial packet and the middle packet arrive at SE0 of LCC3 later. Finally, SE0 of LCC3 sequences the three packets according to the time-scales (that is, the first time-scale and the second time-scales) that are obtained by compensation and that are carried by the three packets, that is, a sequence from front to back is the initial packet whose time-scale is 4 o'clock, the middle packet whose time-scale is 5 o'clock, and the tail packet whose time-scale is 6 o'clock. Then, SE0 of LCC3 successively outputs the three packets to a destination FIC of LCC3 according to the sequence obtained by sequencing, that is, the initial packet is output first, the middle packet is output later, and the tail packet is output at last. Because the sub-packets carry the time-scales obtained by compensation, and a sequence of the time-scales obtained by compensation is the same as the sequence of the original time-scales previously marked by LCC0 on the sub-packets, a destination SE0 in LCC3 may sequence the packets according to the time-scales obtained by compensation, thereby reducing a pressure of a destination SE in a destination LCC in sequencing packets.

In a fourth possible implementation manner of Embodiment 1 of the present invention, the first LCC may further mark a serial number on each of the multiple received sub-packets, where the serial number indicates a sequence in which the sub-packets arrive at the first LCC, so that when receiving the multiple sub-packets, the third LCC may sequence the sub-packets according to the serial numbers of the multiple sub-packets. By using the solution of the implementation manner, a pressure of a destination SE in a destination LCC in sequencing packets may also be reduced.

Optionally, the switching system in this embodiment may also perform one-to-multiple multicast traffic forwarding. The switching system may configure a traffic forwarding mode to that: only 2-hop forwarding is supported. Referring to the switching system shown in FIG. 5, if LCC0 needs to send a same packet to LCC1, LCC2, and LCC3 at a same time, a sending side of LCC0 completes 1-to-3 duplication (that is, multicast duplication of the packet), and in this way, LCC1 or LCC2 may no longer undertake a task for forwarding a multicast packet to LCC3. In addition, the switching system may configure the traffic forwarding mode to 3-hop forwarding, that is, after LCC0 forwards the multicast packet to LCC1 or LCC2, the multicast packet is forwarded to LCC3 by LCC1 or LCC2.

In the method for forwarding traffic according to the present invention, according to a mode configured for a switching system, a first LCC bears a received packet on a third link that is between the first LCC and a third LCC, and forwards the received packet to the third LCC. Therefore, not only line rate forwarding of a packet in the switching system is implemented between any two nodes, but also a capacity expansion capability of the switching system is improved and capacity expansion costs of the switching system are reduced. In addition, according to the method for forwarding traffic according to this embodiment of the present invention, time-scale compensation processing may be performed on the received packet, which reduces a pressure of a destination LCC in sequencing packets.

Optionally, the first LCC, the at least one second LCC, and the at least one third LCC in the switching system may be connected in a mesh form in multiple implementation manners, and each of these LCCs includes at least one SE. The following describes in detail connection manners between the LCCs in the switching system. It should be noted that, merely several exemplary implementation manners in which the switching system is connected in the mesh form are provided herein, but are not intended to limit the technical solutions of the present invention, where a mesh connection is actually interconnections between any two LCCs in multiple LCCs.

A first connection manner: Assuming that a quantity of links (SerDes) provided by each SE in the first LCC, the at least one second LCC, and the third LCC that are in the switching system is m, a quantity of the second LCCs is (p−1), and a quantity of the third LCCs is 1, that is, a sum of quantities of the second LCCs and the third LCCs that are in the switching system is p. The switching system evenly divides m into p groups, a quantity of links in each group is n, n equals a quotient value obtained after m is divided by p, m is an integer multiple of p, and p is an integer greater than or equal to 2. The first LCC may be connected, by using an SE, to the second LCC and the third LCC in the following manners, namely A, B, and C.

A: Each first SE in the first LCC is connected in pairs to a second SE in the second LCC and a third SE in the third LCC, the second SE in the second LCC is also connected in pairs to the third SE in the third LCC, a quantity of links between the first SE and the second SE is n, and a quantity of links between the second SE and the third SE is also n, where both the second SE and the third SE are SEs with a same sequence number as the first SE.

Figure 1:
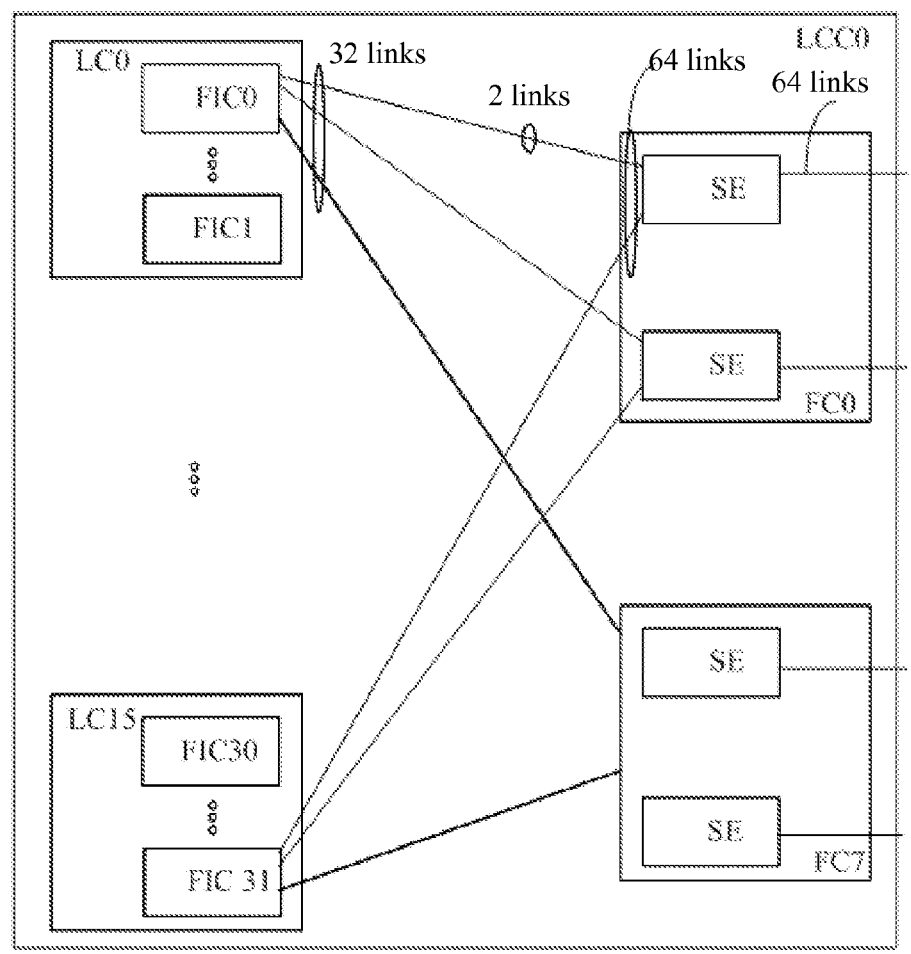
FIG. 1 is a schematic structural diagram of LCC0 in the prior art.
Figure 2:
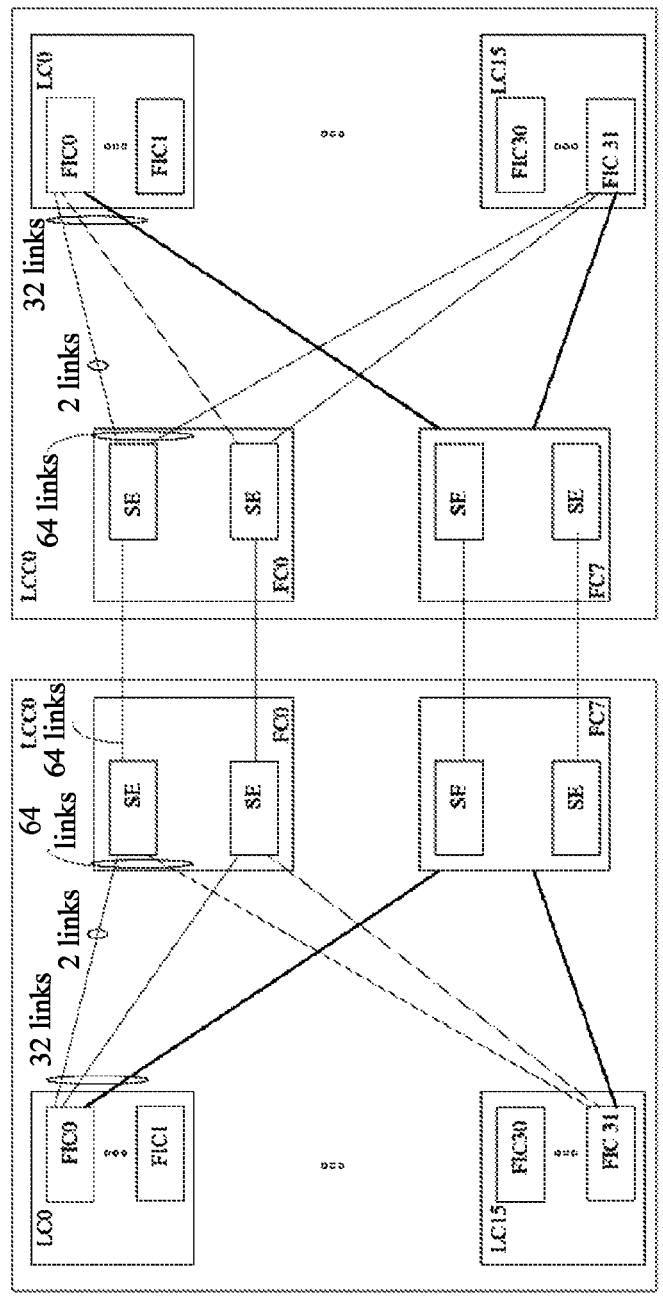
FIG. 2 is a schematic structural diagram of an LCC back-to-back connection in the prior art.
Figure 3:
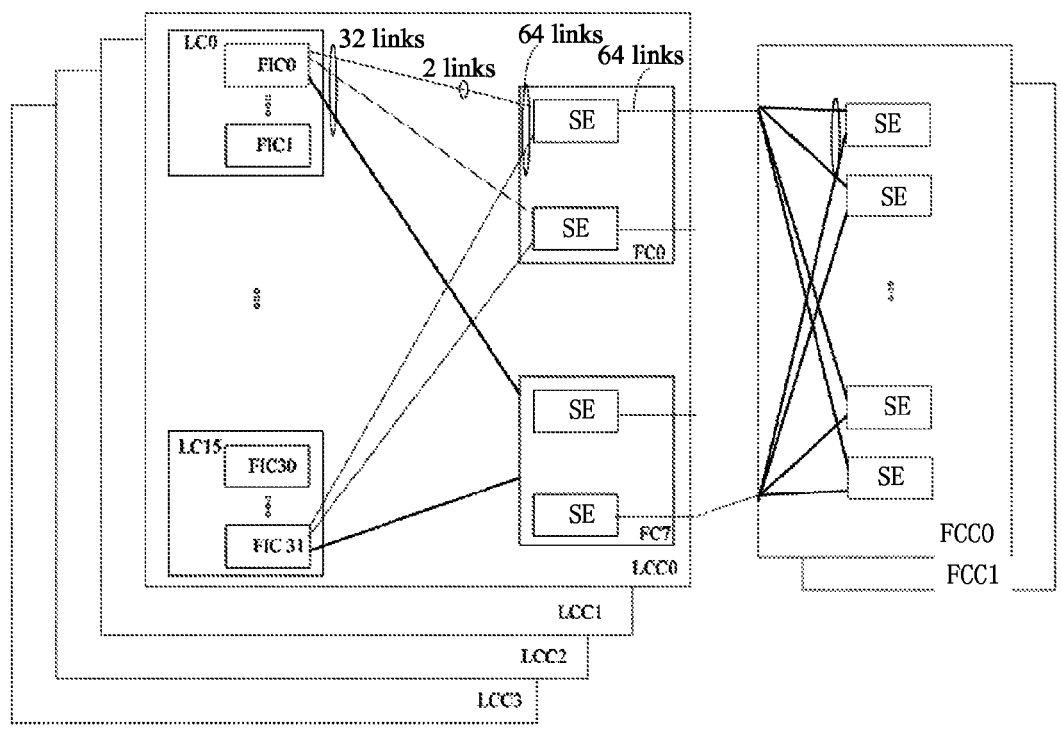
FIG. 3 is a schematic structural diagram of an LCC star connection in the prior art.
Figure 7:
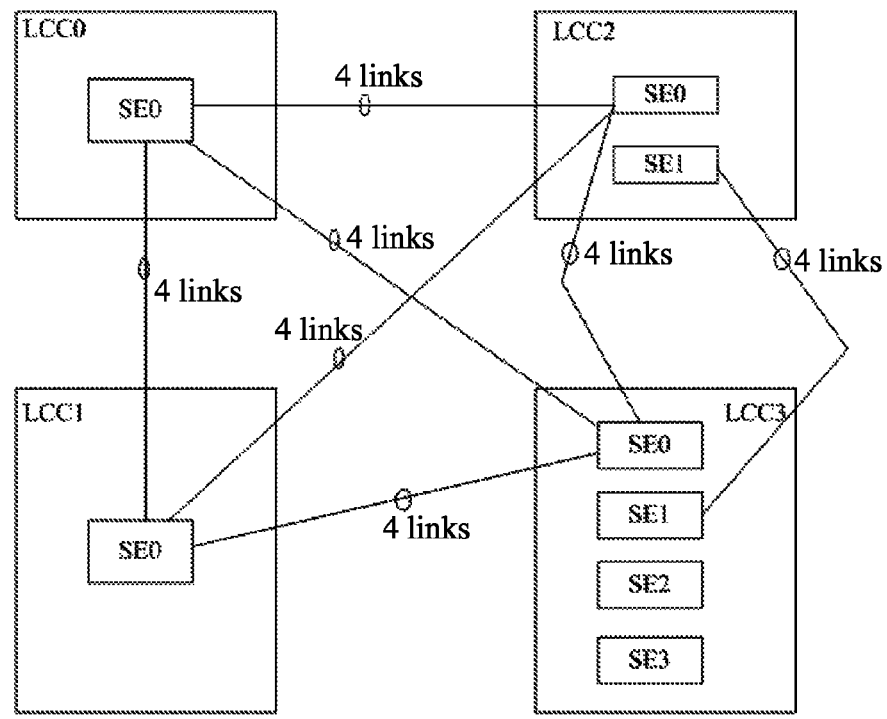
FIG. 7 is topology diagram 3 of a switching system according to an embodiment of the present invention.

Optionally, a quantity of SEs in the first LCC may be the same as or may be different from quantities of SEs in the second LCC and the third LCC. When the quantity of the SEs in the first LCC is different from the quantity of the SEs in the second LCC or the quantity of the SEs in the third LCC, or all the three quantities are different, likewise, each first SE in the first LCC is connected in pairs to the second SE in the second LCC and the third SE in the third LCC. If the quantity of the SEs in the second LCC is greater than the quantity of the SEs in the first LCC, after an SE, in the second LCC, with a same sequence number as the first SE is connected to the first SE, remaining SEs in the second LCC may not be connected (because for these SEs, no SE correspondingly connected to these SEs exists in the first LCC), and the second LCC is also connected to the third LCC by reference to this connection manner. In addition, quantities of links connecting the first SE and the second SE, the first SE and the third SE, and the second SE and the third SE equal n, a value of n is actually a quantity of links of each group when m is evenly divided into p groups. For a specific connection manner, reference may be made to an example shown in FIG. 7 (the switching system shown in FIG. 2 is actually also connected by reference to this connection manner):

In FIG. 7, a switching system includes one first LCC (LCC0), 2 second LCCs (LCC1 and LCC2), and one third LCC (LCC3). Assuming that both LCC0 and LCC1 includes 1 SE, that is, SE0; LCC2 includes 2 SEs, which are SE0 and SE1 respectively; and LCC3 includes 4 SEs, which are SE0 to SE3 respectively. Each SE in LCC0 to LCC3 provides 12 links. Because p, the sum of the quantities of the second LCCs and the third LCCs, equals 3, the 12 links (that is, m) provided by each SE in the first LCC is evenly divided into 3 groups, which are a first group, a second group, and a third group respectively, and n, the quantity of links in each group, equals 4.

When the first SE (SE0) in LCC0 is connected to LCC1, SE0 in LCC0 is connected in pairs to SE0 (SE0 is the second SE) in LCC1, and a quantity of links connecting SE0 in LCC0 and SE0 in LCC1 is 4, that is, SE0 in LCC0 uses the first group of links of SE0 in LCC0 to connect to LCC1.

When the first SE (SE0) in LCC0 is connected to LCC2, SE0 in LCC0 is connected in pairs to SE0 (the second SE) in LCC2, and a quantity of links connecting SE0 in LCC0 and SE0 in LCC2 is also 4, that is, SE0 in LCC0 uses the second group of links of SE0 in LCC0 to connect to LCC2, and SE1 remaining in LCC2 is unused and not connected.

When the first SE (SE0) in LCC0 is connected to LCC3, SE0 in LCC0 is connected in pairs to SE0 (the second SE) in LCC3. In addition, a quantity of links connecting SE0 in LCC0 and SE0 in LCC3 is also 4, that is, SE0 in LCC0 uses the third group of links of SE0 in LCC0 to connect to LCC3, and SE1 to SE3 remaining in LCC3 are unused and not connected.

When LCC1 is connected to LCC2 and LCC3, a connection manner in which LCC1 is connected to LCC2 and LCC3 is the same as the connection manner in which LCC0 is connected to LCC2 and LCC3; when LCC2 is connected to LCC3, because two groups in the 12 links separately provided by SE0 and SE1 that are in LCC2 have been used when LCC2 is separately connected to LCC1 and LCC0 previously (that is, LCC2 has established connection relationships with LCC0 and LCC1 in this case, but has not been connected to LCC3 yet), the last remaining group is used to connect to LCC3, and during the connection, SE0 and SE1 that are in LCC2 are connected in pairs to SE0 and SE1 that are in LCC3 respectively, where a quantity of links between each two connected SEs is 4. SE2 and SE3 remaining in LCC3 are unused and not connected.

B: Each first SE in the first LCC is connected to all SEs in the second LCC and in the third LCC, and a quantity of links connecting each first SE in the first LCC and any SE in the second LCC or the third LCC is a quotient value obtained after n is divided by a quantity of all SEs that are in the second LCC or in the third LCC and are currently connected to the first LCC.

Figure 8:
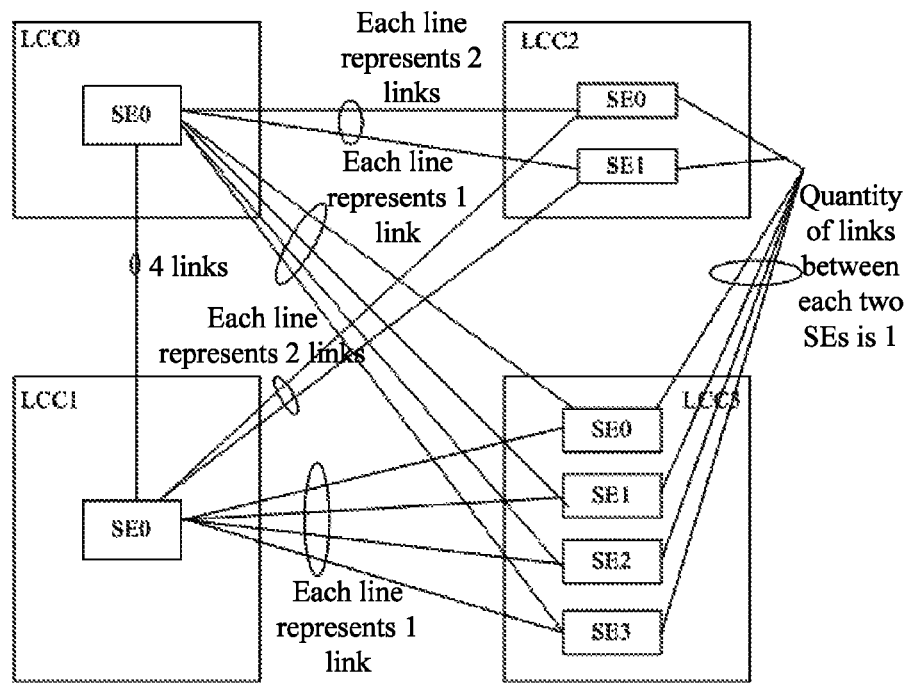
FIG. 8 is topology diagram 4 of a switching system according to an embodiment of the present invention.

Specifically, a connection manner of a switching system in the implementation manner is also described in detail by using an example. Refer to FIG. 8. In FIG. 8, the switching system includes one first LCC (LCC0), 2 second LCCs (LCC1 and LCC2), and one third LCC (LCC3). Assuming that each of LCC0 and LCC1 includes 1 SE, that is, SE0; LCC2 includes 2 SEs, which are SE0 and SE1 respectively; and LCC3 includes 4 SEs, which are SE0 to SE3 respectively. Each SE in LCC0 to LCC3 provides 12 links. Because p, the sum of the quantities of the second LCCs and the third LCCs, equals 3, the 12 links (that is, m) provided by each SE in the first LCC is evenly divided into 3 groups, which are a first group, a second group, and a third group respectively, and n, the quantity of links in each group, equals 4.

When the first SE (SE0) in LCC0 is connected to LCC1, SE0 in LCC0 is connected in pairs to SE0 (the second SE) in LCC1, and a quantity of links connecting SE0 in LCC0 and SE0 in LCC1 is 4/1=4, that is, SE0 in LCC0 uses the first group of links of SE0 in LCC0 to connect to LCC1.

When the first SE (SE0) in LCC0 is connected to LCC2, SE0 in LCC0 needs to be separately connected to SE0 and SE1 that are in LCC2, and a quantity of links between each two connected SEs is 4/2=2, that is, SE0 in LCC0 uses the second group of links of SE0 in LCC0 to connect to LCC2.

When the first SE (SE0) in LCC0 is connected to LCC3, SE0 in LCC0 needs to be separately connected to SE0 to SE3 that are in LCC3, and a quantity of links between each two connected SEs is 4/4=1, that is, SE0 in LCC0 uses the third group of links of SE0 in LCC0 to connect to LCC3.

When LCC1 is connected to LCC2 and LCC3, a connection manner in which LCC1 is connected to LCC2 and LCC3 is the same as the connection manner in which LCC0 is connected to LCC2 and LCC3; when LCC2 is connected to LCC3, because two groups in the 12 links provided by each SE in LCC2 have been used when LCC2 is connected to LCC1 and LCC0 previously (that is, LCC2 has established connection relationships with LCC0 and LCC1 in this case, but has not been connected to LCC3 yet), the last remaining group is used to connect to LCC3; and during the connection, SE0 and SE1 that are in LCC2 are separately connected to all SEs in LCC3, and a quantity of links between each two connected SEs is 4/4=1.

C: Each first SE in the first LCC is connected to fourth SEs in the second LCC and in the third LCC, where a quantity of links between the first SE and the fourth SEs is a quotient value obtained after n is divided by a quantity of the fourth SEs that are in the second LCC or the third LCC and are currently connected to the first LCC, where the fourth SEs are SEs that are in the second LCC or the third LCC and have connection relationships with the first LCC, and n is an integer multiple of the quantity of the fourth SEs that are in the second LCC or the third LCC and are currently connected to the first LCC.

Specifically, each first SE in the first LCC in the implementation manner may be connected to some SEs that are in the second LCC or the third LCC, that is, only some SEs in the second LCC or the third LCC are connected to the first LCC, where this part of SEs may all be called the fourth SEs. Each first SE in the first LCC is connected to the fourth SEs in the second LCC or the third LCC, and the quantity of links between the first SE and the fourth SEs is the quotient value obtained after n is divided by the quantity of the fourth SEs that are in the second LCC or the third LCC and are currently connected to the first LCC.

Figure 9:
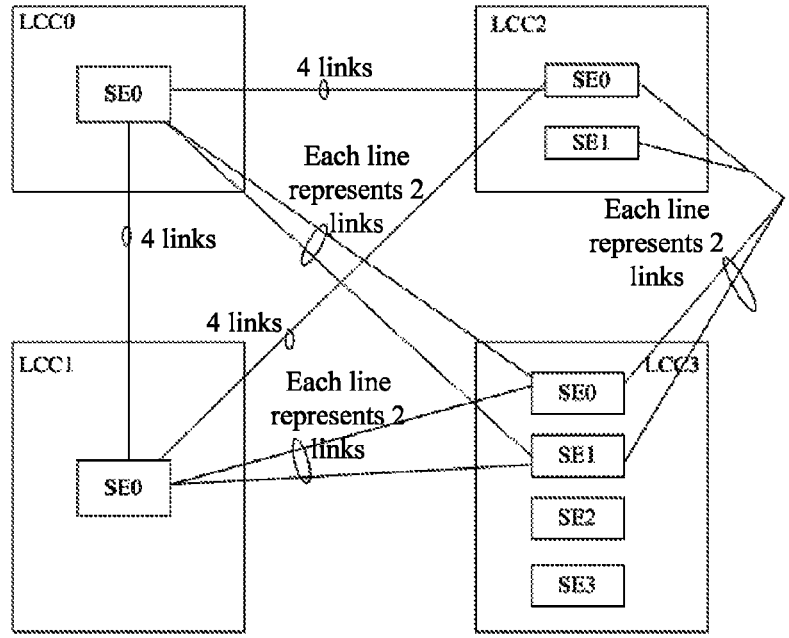
FIG. 9 is topology diagram 5 of a switching system according to an embodiment of the present invention.

Specifically, a connection manner of a switching system in the implementation manner is also described in detail by using an example. Refer to FIG. 9. In FIG. 9, the switching system includes one first LCC (LCC0), 2 second LCCs (LCC1 and LCC2), and one third LCC (LCC3). Assuming that each of LCC0 and LCC1 includes 1 SE, that is, SE0; LCC2 includes 2 SEs, which are SE0 and SE1 respectively; and LCC3 includes 4 SEs, which are SE0 to SE3 respectively. Each SE in LCC0 to LCC3 provides 12 links. Because p, the sum of the quantities of the second LCCs and the third LCCs, equals 3, the 12 links (that is, m) provided by each SE in the first LCC is evenly divided into 3 groups, which are a first group, a second group, and a third group respectively, and n, the quantity of links in each group, equals 4.

When the first SE (SE0) in LCC0 is connected to LCC1, SE0 in LCC0 is connected in pairs to SE0 in LCC1 (in this case, SE0 is the second SE, and is also the fourth SE), and a quantity of links connecting SE0 of LCC0 and SE0 in LCC1 is 4/1=4, that is, SE0 in LCC0 uses the first group of links of SE0 in LCC0 to connect to LCC1.

When the first SE (SE0) in LCC0 is connected to LCC2, assuming that SE0 in LCC2 is the fourth SE (that is, a quantity of the fourth SEs in LCC2 is 1), SE0 in LCC0 needs to be connected to SE0 in LCC2, and a quantity of links between the first SE and the fourth SE is 4/1=4, that is, SE0 in LCC0 uses the second group of links of SE0 in LCC0 to connect to LCC2, and SE1 in LCC2 is unused and not connected.

When the first SE (SE0) in LCC0 is connected to LCC3, assuming that both SE0 and SE1 in LCC3 are the fourth SEs (that is, a quantity of the fourth SEs in LCC3 is 4), SE0 in LCC0 needs to be separately connected to SE0 and SE1 in LCC3, and a quantity of links between the first SE and a fourth SE is 4/2=2.

When LCC1 is connected to LCC2 and LCC3, or LCC2 is connected to LCC3, a connection manner in which LCC1 is connected to LCC2 and LCC3, or LCC2 is connected to LCC3 is similar to the manner in which LCC0 is connected to LCC1, LCC2, and LCC3, which is not repeatedly described herein.

A second connection manner: Assuming that a quantity of links provided by each SE in the first LCC in the switching system is x, a quantity of the second LCCs is (p−1), a quantity of the third LCCs is 1, x is divided into p groups, and a quantity of links in each group equals q times a quantity of SEs that are included in the second LCC or the third LCC and are connected to the first LCC, where x is an integer greater than or equal to p, p is an integer greater than or equal to 2, and q is an integer greater than or equal to 1; then, the first LCC may be connected, by using an SE, to the second LCC and the third LCC in the following three implementation manners, namely, D, E, and F:

D: Each first SE in the first LCC is connected to all SEs that are in the second LCC or the third LCC, and a quantity of links connecting each first SE in the first LCC and any SE in the second LCC or the third LCC is q.

Specifically, x, the quantity of the links provided by each first SE in the first LCC, may be determined according to a total quantity of SEs that are included in the second LCC and the third LCC and are currently connected to the first LCC.

Figure 10:
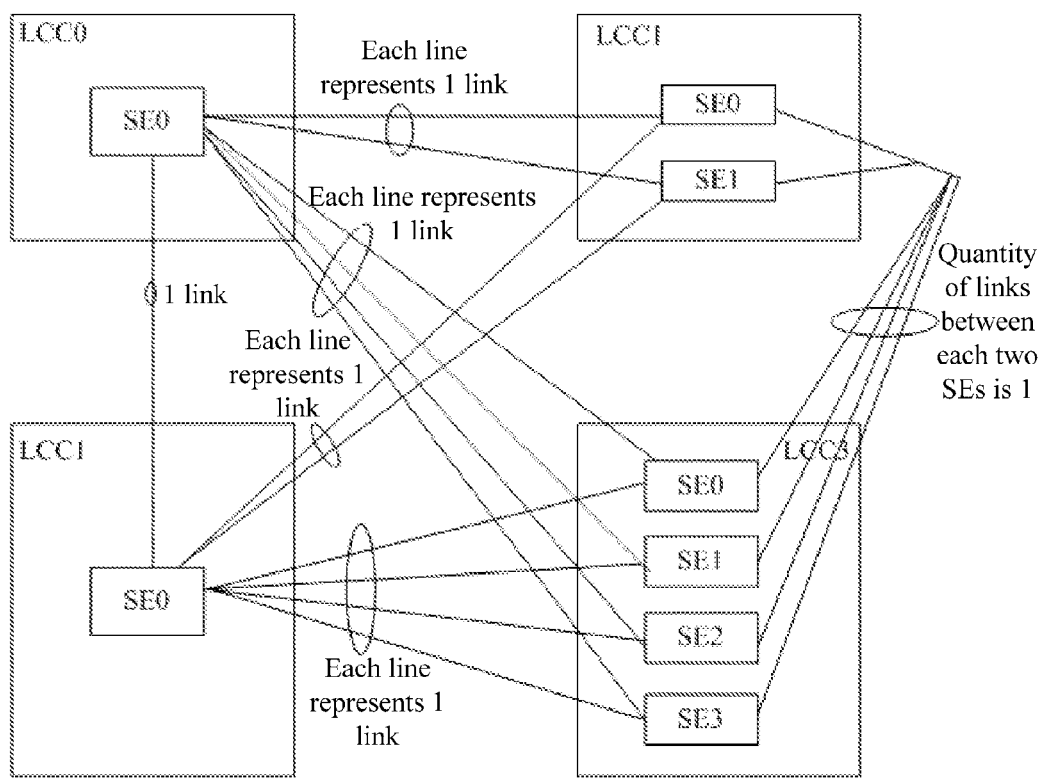
FIG. 10 is topology diagram 6 of a switching system according to an embodiment of the present invention.

To better describe connection manners between LCCs, a specific connection manner of a switching system is used as an example herein. Refer to FIG. 10. In FIG. 10, the switching system includes one first LCC (LCC0), 2 second LCCs (LCC1 and LCC2), and one third LCC (LCC3). Assuming that each of LCC0 and LCC1 includes 1 SE, that is, SE0; LCC2 includes 2 SEs, which are SE0 and SE1 respectively; and LCC3 includes 4 SEs, which are SE0 to SE3 respectively. Assuming that a quantity of links provided by the first SE (SE0) in the first LCC is 1+2+4=7, that is, the quantity of the links provided by SE0 in the first LCC is related to sizes of the second LCCs and of the third LCC. Because p, the sum of the quantities of the second LCCs and the third LCCs, is 3, the 7 (that is, m) links provided by SE0 in the first LCC are divided into 3 groups, which are a first group, a second group, and a third group respectively. A quantity of the first group of links is 1, where the link is configured to connect to LCC1; a quantity of the second group of links is 2, where the links are configured to connect to LCC2; and a quantity of the third group of links is 4, where the links are configured to connect to LCC3. It should be noted that, the division of the 3 groups of links herein are also related to the quantity of SEs that are in the second LCCs or the third LCC and are currently connected to the first LCC. That is, the quantity of the links in the first group is 1 (that is, q=1) times the quantity of the SEs included in LCC1, the quantity of the links in the second group is 1 (that is, q=1) times the quantity of the SEs included in LCC2, and the quantity of the links in the third group is 1 (that is, q=1) times the quantity of the SEs included in LCC3.

When the first SE (SE0) in LCC0 is connected to LCC1, LCC2, and LCC3, each SE0 in LCC0 is connected to SE0 in LCC1 by using the first group of links (1 link), separately connected to SE0 and SE1 that are in LCC2 by using the second group of links (2 links), and connected to SE0 to SE3 that are in LCC3 by using the third group of links (4 links), and q, a quantity of links between each two connected SEs, is 1.

When LCC1 is connected to LCC2 and LCC3, a connection manner in which LCC1 is connected to LCC2 and LCC3 is the same as the connection manner in which LCC0 is connected to LCC2 and LCC3.

When LCC2 is connected to LCC3, because the first group and the second group of links in the 7 links separately provided by each SE (SE0 and SE1) in LCC2 have been used when LCC2 is separately connected to LCC1 and LCC0 previously (that is, LCC2 has established connection relationships with LCC0 and LCC1 in this case, but has not been connected to LCC3 yet), the last remaining group is used to connect to LCC3. That is, SE0 in LCC2 is connected to SE0 to SE3 that are in LCC3, SE1 in LCC2 is connected to SE0 to SE3 that are in LCC3, and a quantity of links between each two connected SEs is 1. It should be noted that, when LCC2 is connected to LCC1 by using the second group of links (2 links), q, the quantity of the links between each two connected SEs, is also 1, and in this case, only 1 link of the second group of links has been used, and the remaining one link is for back-up.

E: Each first SE in the first LCC is connected to fifth SEs that are in the second LCC or the third LCC, where the fifth SEs are SEs that are in the second LCC or the third LCC and have connection relationships with the first LCC, and a quantity of the fifth SEs is y; quantities of links connecting each first SE in the first LCC and the fifth SEs equal to a quotient value obtained after a q multiple, of the quantity of the SEs that are included in the second LCC or the third LCC and are connected to the first LCC, is divided by y.

Specifically, each first SE in the first LCC in this embodiment may be connected to some SEs in the second LCC or in the third LCC, that is, only some SEs in the second LCC or in the third LCC are connected to the first LCC, where this part of SEs may all be called the fifth SEs, that is, the fifth SEs are SEs that are in the second LCC or the third LCC and have connection relationships with the first LCC, and the quantity of the fifth SEs is y.

Figure 11:
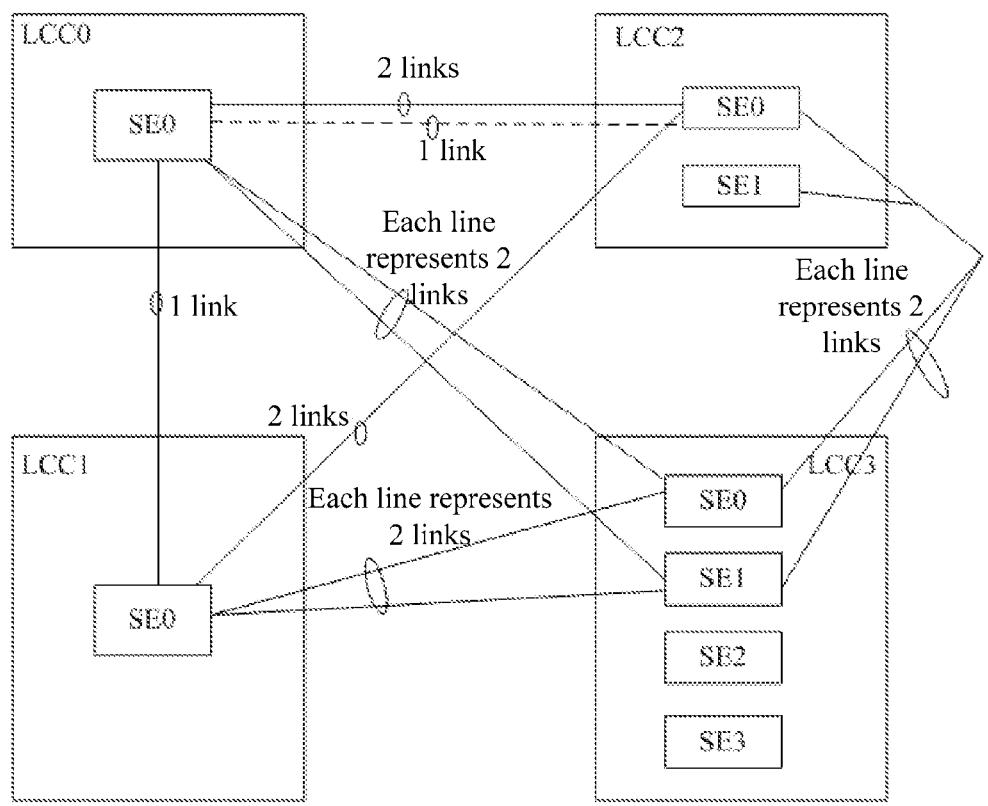
FIG. 11 is topology diagram 7 of a switching system according to an embodiment of the present invention.

To better describe connection manners between LCCs, a specific connection manner of a switching system is used as an example herein. Refer to FIG. 11. In FIG. 11, the switching system includes one first LCC (LCC0), 2 second LCCs (LCC1 and LCC2), and one third LCC (LCC3). Assuming that each of LCC0 and LCC1 includes 1 SE, that is, SE0; LCC2 includes 2 SEs, which are SE0 and SE1 respectively; and LCC3 includes 4 SEs, which are SE0 to SE3 respectively. Each SE in the 4 LCCs, namely, LCC0, LCC1, LCC2, and LCC3, provides 1+2+4=7 links, the 7 links are divided into 3 groups according to a sum of quantities of the second LCCs and the third LCCs, and a quantity of links in each group is related to a quantity of second LCCs that are currently connected to the first LCC. Because p, the sum of the quantities of the second LCCs and the third LCCs, is 3, the 7 (that is, m) links provided by SE0 in the first LCC are divided into 3 groups, which are a first group, a second group, and a third group respectively. A quantity of the first group of links is 1, where the link is configured to connect to LCC1; a quantity of the second group of links is 2, where the links are configured to connect to LCC2; and a quantity of the third group of links is 4, where the links are configured to connect to LCC3. The division of the three groups of links herein is also related to the quantity of the SEs that are in the second LCCs or the third LCC and are currently connected to the first LCC, that is, the quantity of the links in the first group is 1 (that is, q=1) times a quantity of SEs included in LCC1, the quantity of the links in the second group is 1 (that is, q=1) times a quantity of SEs included in LCC2, and the quantity of the links in the third group is 1 (that is, q=1) times a quantity of SEs included in LCC3.

When SE0 in LCC0 is connected to the fifth SE (in this case, SE0 in LCC1 is the second SE, and is also the fifth SE) in LCC1, that is, a value of y, the quantity of the fifth SEs in LCC1, equals 1, SE0 in LCC0 is connected to SE0 in LCC1, and a quantity of links connecting SE0 in LCC0 and SE0 in LCC1 is 1/1=1.

When LCC0 is connected to LCC2, assuming that SE0 in LCC2 is a fifth SE (that is, a quantity of fifth SEs in LCC2 is 1, that is, a value of y is 1), SE0 in LCC0 needs to be connected to SE0 in LCC2, and a quantity of links between the two connected SEs is 2/1=2. SE1 in LCC2 is unused and is not connected to LCC0.

When LCC0 is connected to LCC3, assuming that both SE0 and SE1 that are in LCC3 are fifth SEs (that is, a quantity of fifth SEs in LCC3 is 2, that is, a value of y is 2), SE0 in LCC0 needs to be separately connected to SE0 and SE1 that are in LCC3, and a quantity of links between the two connected SEs is 4/2=2. SE2 and SE3 that are in LCC3 are unused and are not connected to LCC0.

When LCC1 is connected to LCC2 and LCC3, a connection manner in which LCC1 is connected to LCC2 and LCC3 is the same as the connection manner in which LCC0 is connected to LCC2 and LCC3.

When LCC2 is connected to LCC3, because the first group and the second group of links in the 7 links provided by each SE in LCC2 have been used when LCC2 is separately connected to LCC1 and LCC0 previously, that is, LCC2 has established connection relationships with LCC0 and LCC1 in this case, but has not been connected to LCC3 yet). The third group, namely the last remaining group, is used to connect to LCC3, and during the connection, each SE in LCC2 is separately connected to SE0 and SE1 that are in LCC3, and a quantity of links between each two connected SEs is 4/2=2. It should be noted that, one link that is between LCC2 and LCC0 and is shown by a dotted line in FIG. 11 is a quantity of the first group of links extending from LCC2, that is, a quantity of links of the one link equals a quantity of SEs in LCC0.

F: Each first SE in the first LCC is connected in pairs to a second SE in the second LCC or a third SE in the third LCC, a quantity of links between the first SE and the second SE is a quantity of all second SEs in the second LCC in which the second SE exists, and a quantity of links between the first SE and the third SE is a quantity of all second SEs in the second LCC in which the third SE exists, where both the second SE and the third SE are SEs with a same sequence number as the first SE.

Figure 12:
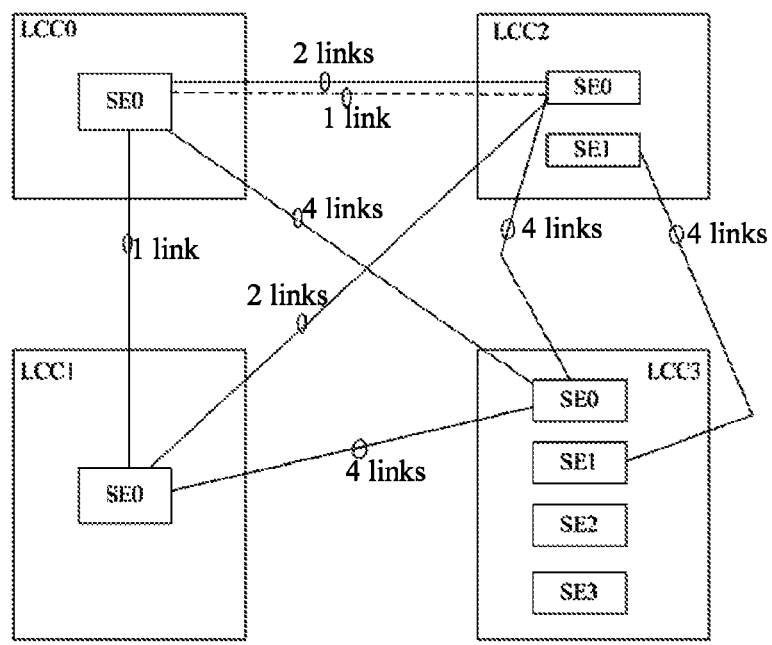
FIG. 12 is topology diagram 8 of a switching system according to an embodiment of the present invention.

To better describe connection manners between LCCs, a specific connection manner of a switching system is used as an example herein. Refer to FIG. 12. In FIG. 12, the switching system includes one first LCC (LCC0), 2 second LCCs (LCC1 and LCC2), and one third LCC (LCC3). Assuming that each of LCC0 and LCC1 includes 1 SE, that is, SE0; LCC2 includes 2 SEs, which are SE0 and SE1 respectively; and LCC3 includes 4 SEs, which are SE0 to SE3 respectively. In addition, each SE in the 4 LCCs provides 1+2+4=7 links, the 7 links are divided into 3 groups according to a sum of quantities of the second LCCs and the third LCCs, and a quantity of links in each group is related to a quantity of SEs that are in the second LCCs or the third LCC and are currently connected to the first LCC. Because p, the sum of the quantities of the second LCCs and the third LCCs, is 3, the 7 (that is, m) links provided by SE0 in the first LCC are divided into 3 groups, which are a first group, a second group, and a third group respectively. A quantity of the first group of links is 1, where the link is configured to connect to LCC1; a quantity of the second group of links is 2, where the links are configured to connect to LCC2; and a quantity of the third group of links is 4, where the links are configured to connect to LCC3. The division of the three groups of links herein is also related to the quantity of the SEs that are in the second LCCs or the third LCC and are currently connected to the first LCC, that is, the quantity of the links in the first group is 1 (that is, q=1) times a quantity of SEs included in LCC1, the quantity of the links in the second group is 1 (that is, q=1) times a quantity of SEs included in LCC2, and the quantity of the links in the third group is 1 (that is, q=1) times a quantity of SEs included in LCC3.

When the first SE (SE0) in LCC0 is connected to LCC1, SE0 in LCC0 is connected in pairs to SE0 (SE0 is the second SE) in LCC1, and a quantity of links connecting SE0 in LCC0 and SE0 in LCC2 is 1.

When the first SE (SE0) in LCC0 is connected to LCC2, SE0 in LCC0 is connected in pairs to SE0 in LCC1, SE1 in LCC1 is unused and not connected, and a quantity of links connecting SE0 in LCC0 and SE0 in LCC2 is 2. Other SEs remaining in LCC2 are not second SEs and may be unused and may not be connected.

When the first SE (SE0) in LCC0 is connected to LCC3, SE0 in LCC0 is connected in pairs to SE0 (that is, the third SE) in LCC3, SE1 to SE3 remaining in LCC1 are unused and not connected, and a quantity of links connecting SE0 in LCC0 and SE0 in LCC3 is 4. Other SEs remaining in LCC2 are not second SEs and may be unused and may not be connected.

When LCC1 is connected to LCC2 and LCC3, a connection manner in which LCC1 is connected to LCC2 and LCC3 is the same as the connection manner in which LCC0 is connected to LCC2 and LCC3.

When LCC2 is connected to LCC3, because the first group and the second group of links in the 7 links provided by each SE in LCC2 have been used when LCC2 is separately connected to LCC1 and LCC0 previously (that is, LCC2 has established connection relationships with LCC0 and LCC1 in this case, but has not been connected to LCC3 yet), the third group of links, namely the last remaining group, is used to connect to LCC3, and during the connection, SE0 and SE1 that are in LCC2 are connected in pairs to SE0 and SE1 (2 SEs are the third SEs) that are in LCC3 respectively, SE2 and SE3 remaining in LCC3 are unused and not connected, and a quantity of links between each two connected SEs is 4. It should be noted that, one link that is between LCC2 and LCC0 and is shown by a dotted line in FIG. 12 is a quantity of the first group of links extending from LCC2, that is, a quantity of links of the one link equals a quantity of SEs in LCC0.

In the method for forwarding traffic according to the present invention, according to a mode configured for a switching system, a first LCC bears a received packet on a third link that is between the first LCC and a third LCC, and forwards the received packet to the third LCC. Therefore, not only line rate forwarding of a packet in the switching system is implemented between any two nodes, but also a capacity expansion capability of the switching system is improved and capacity expansion costs of the switching system are reduced.

Persons of ordinary skill in the art may understand that: all or a part of the steps of the foregoing method embodiments may be implemented by a program instructing relevant hardware. The foregoing program may be stored in a computer readable storage medium. When the program runs, the steps included in the foregoing method embodiments are performed, and the foregoing storage medium includes any medium that can store program code, such as a ROM, a RAM, a magnetic disk, or an optical disc.

Figure 13:
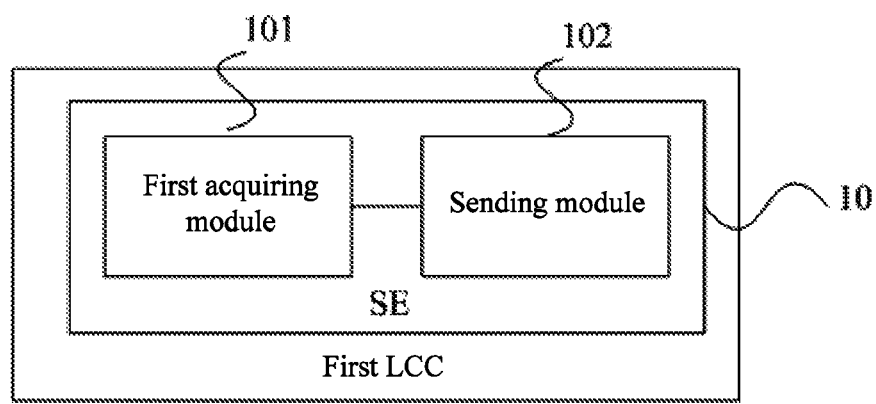
FIG. 13 is schematic structural diagram 1 of a first LCC in a switching system according to Embodiment 2 of the present invention.

FIG. 13 is schematic structural diagram 1 of a first LCC in a switching system according to Embodiment 2 of the present invention. It should be noted that, for convenience of description, in this embodiment, LCCs are distinguished as a first LCC, a second LCC, and a third LCC, but the first LCC herein may actually be any LCC in the switching system, and therefore, in this embodiment, a function of the entire switching system is presented by describing a function of any LCC of the switching system in a packet forwarding process. Referring to FIG. 13, the first LCC is interconnected with at least one second LCC and at least one third LCC in the switching system according to a wireless mesh form topology, and the first LCC includes at least one switch element SE 10, where the SE 10 includes: a first acquiring module 101 and a sending module 102. The first acquiring module 101 is configured to receive a packet, and parse the packet to acquire a destination address of the packet; and the sending module 102 is configured to: when the destination address acquired by the first acquiring module 101 indicates that the packet is to be sent to the third LCC, if a currently preset configuration mode of the switching system is a first configuration mode, bear the packet on a third link, and forward the packet to the third LCC, where the third link includes: a first link and a second link, or a second link; the first link is a directly connected two-hop link between the first LCC and the third LCC, and a quantity of links included by the first link is at least one; the second link is an n-hop link that passes through the at least one second LCC and that is between the first LCC and the third LCC, and a quantity of links included by the second link is at least one, where n is a natural number, and $3 \leq n \leq N$; and the first configuration mode indicates that an N-hop mode is currently applied to the switching system, where N is a natural number greater than or equal to 3.

The switching system provided by this embodiment of the present invention may execute the foregoing method embodiment, and implementation principles and technical effects thereof are similar, and details are not repeatedly described herein.

Figure 14:
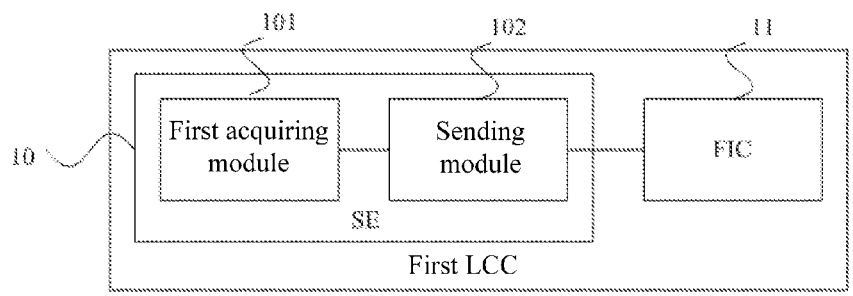
FIG. 14 is schematic structural diagram 2 of a first LCC in a switching system according to Embodiment 2 of the present invention.

FIG. 14 is schematic structural diagram 2 of a first LCC in a switching system according to Embodiment 2 of the present invention. Based on the foregoing embodiment shown in FIG. 13, the first LCC in the switching system may further include a fabric interface chip (FIC) 11, and the sending module 102 is specifically configured to forward the packet to the FIC11 when the destination address acquired by the first acquiring module 101 indicates that the packet is to be sent to the FIC11.

The switching system provided by this embodiment of the present invention may execute the foregoing method embodiment, and implementation principles and technical effects thereof are similar, and details are not repeatedly described herein.

Based on the foregoing embodiment shown in FIG. 14, further, the sending module 102 may further be configured to: when the destination address indicates that the packet is to be sent to the third LCC, if the currently preset configuration mode of the switching system is a second configuration mode, bear the packet on the first link, and forward the packet to the third LCC, where the second configuration mode indicates that a two-hop mode is currently applied to the switching system.

Further, the sending module 102 is specifically configured to evenly distribute the packet to the at least one link in the first link in a round-robin manner, to perform forwarding.

Figure 15:
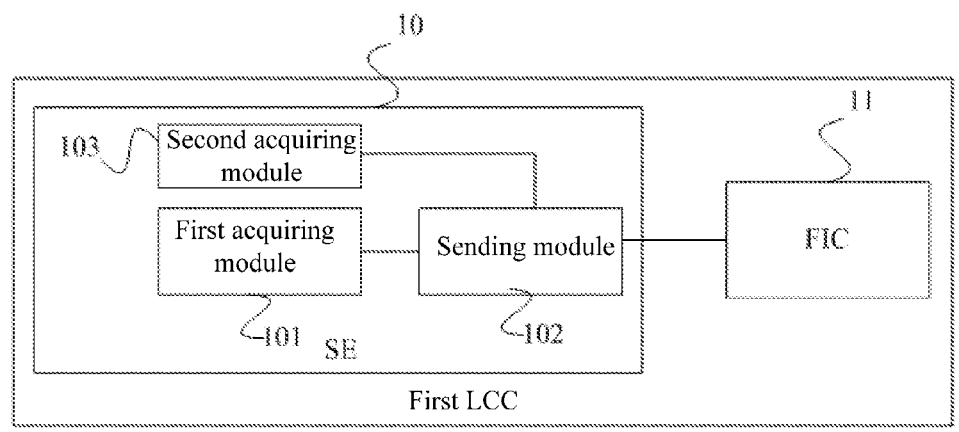
FIG. 15 is schematic structural diagram 3 of a first LCC in a switching system according to Embodiment 2 of the present invention.

Further, refer to schematic structural diagram 3 of a first LCC in a switching system provided in FIG. 15. Based on the foregoing embodiment shown in FIG. 14, the foregoing SE10 may include: a second acquiring module 103, where the second acquiring module 103 is configured to acquire status information of the at least one link in the first link; and the sending module 102 is configured to distribute, according to the status information, acquired by the second acquiring module 103, of the at least one link in the first link, the packet to the at least one link in the first link to perform forwarding.

If the status information acquired by the second acquiring module 103 indicates congestion degrees of the at least one link in the first link, the sending module 102 is specifically configured to adjust, according to the congestion degrees of the at least one link in the first link, traffic of the packet distributed to the at least one link in the first link, so that traffic borne on each link in the first link matches a congestion degree of the link.

Figure 16:
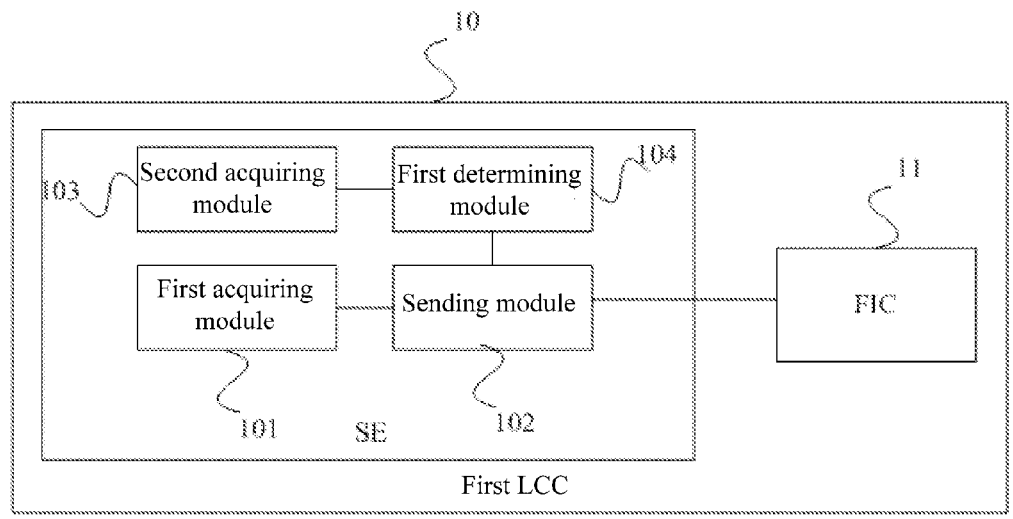
FIG. 16 is schematic structural diagram 4 of a first LCC in a switching system according to Embodiment 2 of the present invention.

If the status information acquired by the second acquiring module 103 indicates abnormality information of the at least one link in the first link, refer to schematic structural diagram 4 of a first LCC in a switching system shown in FIG. 16. Based on the foregoing embodiment shown in FIG. 15, further, as shown in FIG. 16, the foregoing SE may further include: a first determining module 104, where the first determining module 104 is configured to determine an abnormal link in the first link according to the abnormality information, acquired by the second acquiring module 103, of the at least one link in the first link; and the sending module 102 is configured to distribute the packet to a normal link, other than the abnormal link, in the first link to perform the forwarding.

The switching system provided by this embodiment of the present invention may execute the foregoing method embodiment, and implementation principles and technical effects thereof are similar, and details are not repeatedly described herein.

Refer to the foregoing embodiment shown in FIG. 13. Optionally, the sending module 102 may further be configured to evenly distribute the packet to the at least one link in the third link in a round-robin manner, to perform forwarding.

Optionally, when the third link includes the first link and the second link, the sending module 102 may further be configured to distribute the packet to the at least one link in the first link preferentially, and distribute, after the at least one link in the first link reach a saturation state, a remaining packet in the packet to the at least one link in the second link.

Figure 17:
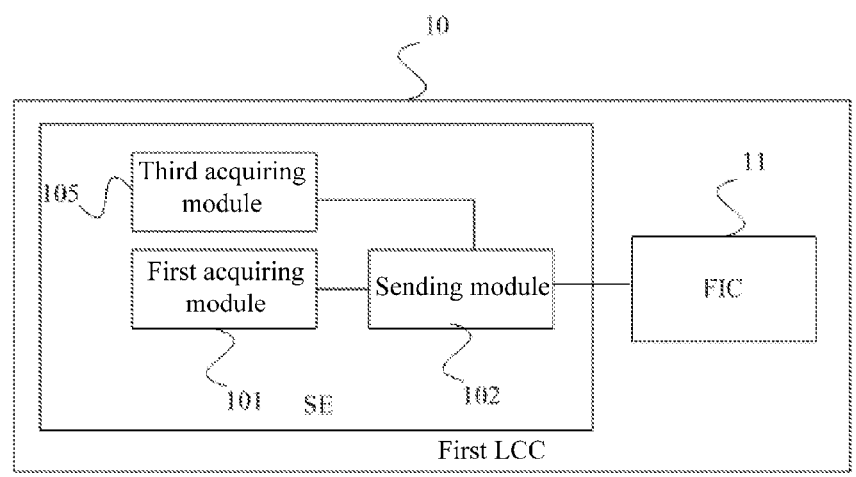
FIG. 17 is schematic structural diagram 5 of a first LCC in a switching system according to Embodiment 2 of the present invention.

Optionally, refer to schematic structural diagram 5 of a first LCC in a switching system shown in FIG. 17. Based on the foregoing embodiment shown in FIG. 14, further, as shown in FIG. 17, the foregoing SE 10 may further include a third acquiring module 105, configured to acquire status information of the at least one link in the third link; and the sending module 102 is configured to distribute, according to the status information, acquired by the third acquiring module 105, of the at least one link in the third link, the packet to the at least one link in the third link to perform forwarding.

If the status information acquired by the third acquiring module 105 indicates congestion degrees of the at least one link in the third link, the sending module 102 is specifically configured to adjust, according to the congestion degrees of the at least one link in the third link, traffic of the packet distributed to the at least one link in the third link, so that traffic borne on each link in the third link matches a congestion degree of the link.

Figure 18:
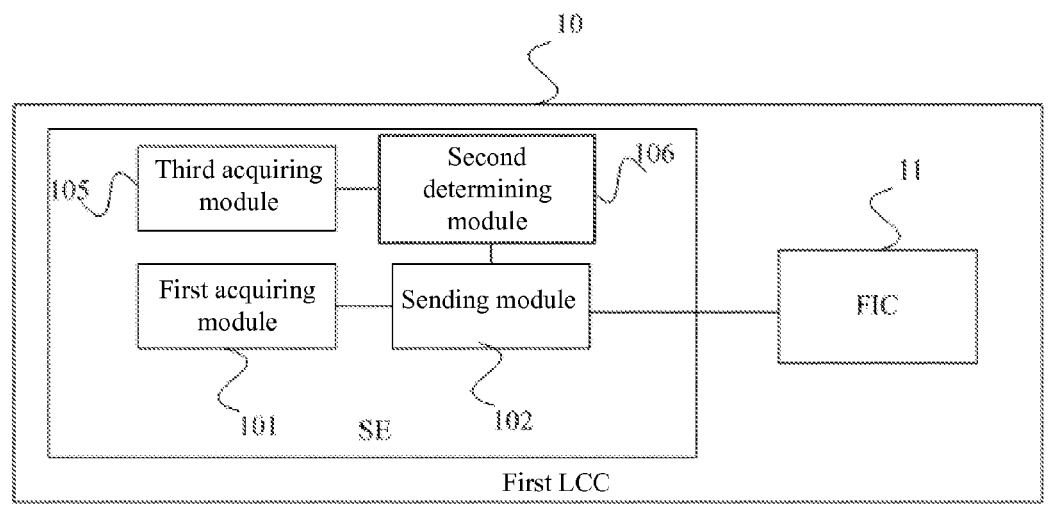
FIG. 18 is schematic structural diagram 6 of a first LCC in a switching system according to Embodiment 2 of the present invention.

If the status information acquired by the third acquiring module 105 indicates abnormality information of the at least one link in the third link, refer to schematic structural diagram 6 of a first LCC in a switching system shown in FIG. 18. Based on the foregoing embodiment shown in FIG. 17, further, as shown in FIG. 18, the foregoing SE 10 may further include: a second determining module 106. The second determining module 106 is configured to determine an abnormal link in the third link according to the abnormality information of the at least one link in the third link; and the sending module 102 is configured to distribute the packet to a normal link, other than the abnormal link, in the third link to perform the forwarding.

The switching system provided by this embodiment of the present invention may execute the foregoing method embodiment, and implementation principles and technical effects thereof are similar, and details are not repeatedly described herein.

Figure 19:
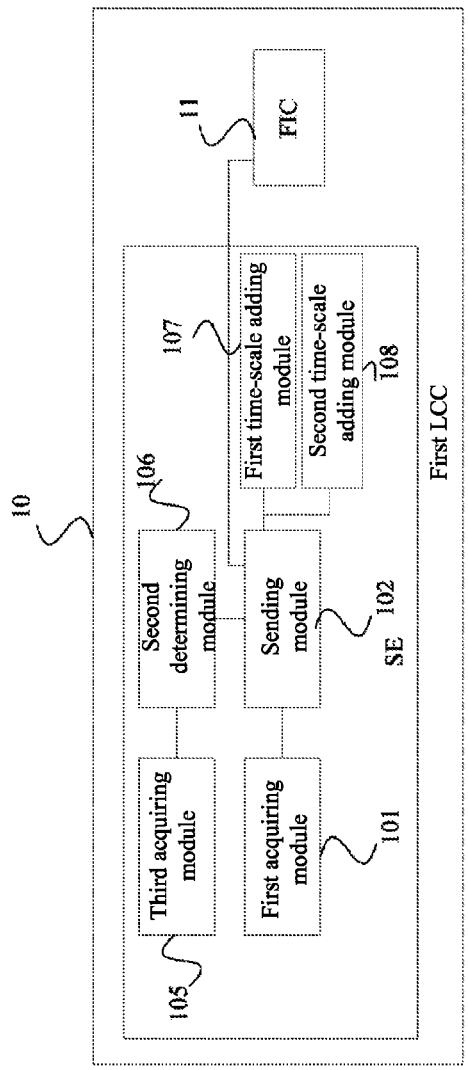
FIG. 19 is schematic structural diagram 7 of a first LCC in a switching system according to Embodiment 2 of the present invention.

FIG. 19 is schematic structural diagram 7 of a first LCC in a switching system according to Embodiment 2 of the present invention. The third link includes the first link and the second link. The packet includes a first sub-packet and a second sub-packet, where the first sub-packet is a sub-packet to be distributed to the first link, and the second sub-packet is a sub-packet to be distributed to the second link. Based on the foregoing embodiment shown in FIG. 18, the SE 10 may further include: a first time-scale adding module 107 or a second time-scale adding module 108. Both the first time-scale adding module 107 and the second time-scale adding module 108 are respectively configured to add a first original time-scale to the first sub-packet and add a second original time-scale to the second sub-packet, where the first original time-scale indicates an initial time at which the first sub-packet arrives at the first LCC, and the second original time-scale indicates an initial time at which the second sub-packet arrives at the first LCC, so that the third LCC separately obtains, according to a first forwarding delay of the first sub-packet and a second forwarding delay of the second sub-packet, a first time-scale by adding a first time-scale compensation to the first original time-scale and a second time-scale by adding a second time-scale compensation to the second original time-scale, so that a time sequence of the first time-scale and the second time-scale is consistent with a time sequence of the first original time-scale and the second original time-scale, where a sum of the first forwarding delay and the first time-scale compensation equals a sum of the second forwarding delay and the second time-scale compensation.

It should be noted that, in the foregoing embodiment shown in FIG. 13, when the packet is distributed, content included in the third link is not limited, that is, the third link may include only the second link, or may include the first link and the second link, and then, the foregoing SE 10 includes the first time-scale adding module 107; and when the packet is distributed, the content included in the third link is limited, that is, it is limited that the third link includes only the first link and the second link, and then, the foregoing SE 10 includes the second time-scale adding module 108.

The switching system provided by this embodiment of the present invention may execute the foregoing method embodiment, and implementation principles and technical effects thereof are similar, and details are not repeatedly described herein.

It should be noted that, each module in FIG. 13 to FIG. 19 is a module including a circuit system, and each module may be a PCB (printed circuit board), or an IC (integrated circuit), or may be a part of functional circuits in a PCB or an IC, which is not limited in the embodiment.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof as long as these modifications or replacements do not cause the essence of the corresponding technical solutions to depart from the scope of the technical solutions of the embodiments of the present invention.

What is claimed is:

1. A method for forwarding traffic of a switching system, wherein the switching system comprises a first line card chassis (LCC) at least one second LCC, and at least one third LCC; wherein the first LCC, the at least one second LCC, and the at least one third LCC are interconnected according to a wireless mesh form topology; and the method comprises:

receiving, by the first LCC, a packet comprising first and second sub-packets to be distributed to first and second links, and parsing the packet to acquire a destination address of the packet; and when the destination address indicates that the packet is to be sent to the third LCC and when a currently preset configuration mode of the switching system is a first configuration mode, bearing, by the first LCC, the packet on the first and second links, and forwarding the packet to the third LCC, including preferentially distributing, by the first LCC, the packet to at least one link in the first link, and distributing a remaining packet in the packet to at least one link in the second link after the at least one link in the first link reaches a saturation state, wherein the first link is a directly connected two-hop link between the first LCC and the third LCC, and a quantity of links comprised by the first link is at least one, the second link is an n-hop link that passes through the at least one second LCC and that is between the first LCC and the third LCC, and a quantity of links comprised by the second link is at least one, wherein n is a natural number, 3≤n≤N, and N is a natural number greater than or equal to 3; and the first configuration mode indicates that an N-hop mode is currently applied to the switching system; and separately adding, by the first LCC, a first original time-scale to the first sub-packet, and adding a second original time-scale to the second sub-packet, wherein the first original time-scale indicates an initial time at which the first sub-packet arrives at the first LCC, and the second original time-scale indicates an initial time at which the second sub-packet arrives at the first LCC, enabling the third LCC to separately obtain, according to a first forwarding delay of the first sub-packet and a second forwarding delay of the second sub-packet, a first time-scale by adding a first time-scale compensation to the first original time-scale and a second time-scale by adding a second time-scale compensation to the second original time-scale, enabling a time sequence of the first and second time-scales to be consistent with a time sequence of the first and second original time-scales, wherein a sum of the first forwarding delay and the first time-scale compensation equals a sum of the second forwarding delay and the second time-scale compensation.

2. The method according to claim 1, wherein the method further comprises:

when the destination address indicates that the packet is to be sent to the third LCC and when the currently preset configuration mode of the switching system is a second configuration mode, bearing, by the first LCC, the packet on the first link, and forwarding the packet to the third LCC, wherein the second configuration mode indicates that a two-hop mode is currently applied to the switching system.

3. The method according to claim 2, wherein the bearing, by the first LCC, the packet on the first link, and forwarding the packet to the third LCC comprises:

evenly distributing, by the first LCC, the packet to the at least one link in the first link in a round-robin manner, to perform the forwarding the packet to the third LCC.

4. The method according to claim 2, the bearing, by the first LCC, the packet on the first link, and forwarding the packet to the third LCC comprises:

acquiring, by the first LCC, status information of the at least one link in the first link; and distributing, by the first LCC according to the status information of the at least one link in the first link, the packet to the at least one link in the first link to perform the forwarding the packet to the third LCC.

5. The method according to claim 4, wherein when the status information of the at least one link in the first link indicates congestion degrees of the at least one link in the first link, the distributing, by the first LCC according to the status information of the at least one link in the first link, the packet to the at least one link in the first link to perform forwarding comprises:

adjusting, by the first LCC according to the congestion degrees of the at least one link in the first link, traffic of the packet distributed to the at least one link in the first link, to enable traffic borne on each link in the first link to match a congestion degree of the link.

6. The method according to claim 4, wherein when the status information by the first LCC according to the status information indicates abnormality information of the at least one link in the first link, the distributing, by the first LCC according to the status information by the first LCC according to the status information, the packet to the at least one link in the first link to perform forwarding comprises:

determining, by the first LCC, an abnormal link in the first link according to the abnormality information of the at least one link in the first link; and distributing, by the first LCC, the packet to a normal link in the first link to perform the forwarding.

7. The method according to claim 1, wherein the bearing, by the first LCC, the packet on the first and second links, and forwarding the packet to the third LCC comprises evenly distributing, by the first LCC, the packet to the at least one link in the first and second links in a round-robin manner, to perform forwarding.

8. The method according to claim 1, wherein the bearing, by the first LCC, the packet on the first and second links, and forwarding the packet to the third LCC comprises:

acquiring, by the first LCC, status information of the at least one link in the first and second links; and distributing, by the first LCC according to the status information of the at least one link in the first and second links, the packet to the at least one link in the first and second links to perform forwarding.

9. The method according to claim 8, wherein when the status information of the at least one link in the first and second links indicates congestion degrees of the at least one link in the first and second links, the distributing, by the first LCC according to the status information of the at least one link in the first and second links, the packet to the at least one link in the first and second links to perform forwarding comprises:

adjusting, by the first LCC according to the congestion degrees of the at least one link in the first and second links, traffic of the packet distributed to the at least one link in the first and second links, to enable traffic borne on each link in the first and second links to match a congestion degree of the link.

10. The method according to claim 8, wherein when the status information of the at least quantity of links comprised by the first and second links indicates abnormality information of the at least one link in the first and second links, the distributing, by the first LCC according to the status information of the at least one link in the first and second links, the packet to the at least one link in the first and second links to perform forwarding comprises:

determining, by the first LCC, an abnormal link in the first and second links according to the abnormality information of the at least one link in the first and second links; and distributing, by the first LCC, the packet to a normal link in the first and second links to perform the forwarding.

11. The method according to claim 1, wherein the first LCC forwards the packet to a destination fabric interface chip (FIC) in the first LCC when the destination address indicates that the packet is to be sent to the first LCC.

12. A first line card chassis (LCC) in a switching system comprising a first LCC, at least one second LCC, and at least one third LCC, wherein the first LCC is interconnected with the at least one second LCC and the at least one third LCC according to a wireless mesh form topology; and the first LCC comprises at least one switch element (SE), wherein the at least one SE comprises:
- a first acquiring module, configured to receive a packet comprising first and second sub-packets to be distributed to first and second links, and parse the packet to acquire a destination address of the packet; and
- a sending module, configured to, when the destination address indicates that the packet is to be sent to the third LCC, and when a currently preset configuration mode of the switching system is a first configuration mode, bear the packet on first and second links, and forward the packet to the third LCC, including preferentially distributing, by the first LCC, the packet to at least one link in the first link, and distributing a remaining packet in the packet to at least one link in the second link after the at least one link in the first link reaches a saturation state;
- wherein the first link is a directly connected two-hop link between the first LCC and the third LCC, and a quantity of links comprised by the first link is at least one;
- the second link is an n-hop link that passes through the at least one second LCC and that is between the first LCC and the third LCC, and a quantity of links comprised by the second link is at least one, wherein n is a natural number, 3≤n≤N, and N is a natural number greater than or equal to 3; and
- the first configuration mode indicates that an N-hop mode is currently applied to the switching system; and
- a second time-scale adding module, configured to separately add first and second original time-scales to the first and second sub-packets, respectively,
- wherein the first and second original time-scales indicate initial times at which the first and second sub-packets, respectively, arrive at the first LCC, enabling the third LCC to separately obtain, according to a first forwarding delay of the first sub-packet and a second forwarding delay of the second sub-packet, a first time-scale by adding a first time-scale compensation to the first original time-scale and a second time-scale by adding a second time-scale compensation to the second original time-scale, enabling a time sequence of the first and second time-scales to be consistent with a time sequence of the first and second original time-scales, wherein a sum of the first forwarding delay and the first time-scale compensation equals a sum of the second forwarding delay and the second time-scale compensation.

13. The first LCC according to claim 12, wherein the sending module is further configured to:

when the destination address indicates that the packet is to be sent to the third LCC, and when the currently preset configuration mode of the switching system is a second configuration mode, bear the packet on the first link, and forward the packet to the third LCC, wherein the second configuration mode indicates that a two-hop mode is currently applied to the switching system.

14. The first LCC according to claim 13, wherein the sending module is configured to evenly distribute the packet to the at least one link in the first link in a round-robin manner, to perform the forwarding the packet to the third LCC.

15. The first LCC according to claim 13, wherein:
- the SE further comprises: a second acquiring module;
- the second acquiring module is configured to acquire status information of the at least one link in the first link; and
- the sending module is configured to distribute, according to the status information, acquired by the second acquiring module, of the at least one link in the first link, the packet to the at least one link in the first link to perform the forwarding the packet to the third LCC.

16. The first LCC according to claim 15, wherein when the status information acquired by the second acquiring module indicates congestion degrees of the at least one link in the first link, the sending module is configured to adjust, according to the congestion degrees of the at least one link in the first link, traffic of the packet distributed to the at least one link in the first link, to enable traffic borne on each link in the first link to match a congestion degree of the link.

17. The first LCC according to claim 15, wherein when the status information acquired by the second acquiring module indicates abnormality information of the at least one link in the first link, the SE further comprises a first determining module, wherein:
- the first determining module is configured to determine an abnormal link in the first link according to the abnormality information of the at least one link in the first link; and
- the sending module is configured to distribute the packet to a normal link in the first link to perform the forwarding.

18. The first LCC according to claim 12, wherein the sending module is configured to evenly distribute the packet to the at least one link in the first and second links in a round-robin manner, to perform forwarding.

19. The first LCC according to claim 12, wherein the SE further comprises a third acquiring module, wherein:
- the third acquiring module is configured to acquire status information of the at least one link in the first and second links; and
- the sending module is configured to distribute, according to the status information, the packet to the at least one link in the first and second links to perform forwarding.

20. The first LCC according to claim 19, wherein when the status information acquired by the third acquiring module indicates congestion degrees of the at least one link in the first and second links, the sending module is configured to adjust, according to the congestion degrees of the at least one link in the first and second links, traffic of the packet distributed to the at least one link in the first and second links, to enable traffic borne on each link in the first and second links to match a congestion degree of the link.

21. The first LCC according to claim 19, wherein when the status information acquired by the third acquiring module indicates abnormality information of the quantity of links comprised by the first and second links, the SE further comprises a second determining module, wherein:
 the second determining module is configured to determine an abnormal link in the first and second links according to the abnormality information of the at least one link in the first and second links; and
the sending module is configured to distribute the packet to a normal link, in the first and second links to perform the forwarding.

22. The first LCC according to claim 12, wherein the first LCC further comprises a fabric interface chip (FIC); and
 the sending module is further configured to forward the packet to the FIC when the destination address indicates that the packet is to be sent to the FIC.

* * * * *